(12) United States Patent
Shefet et al.

(10) Patent No.: US 6,855,047 B2
(45) Date of Patent: Feb. 15, 2005

(54) REPETITIVE HIGH-DENSITY PACKING MECHANISMS FOR ARRANGING SUSPENDED LENGTHS OF ELONGATED ITEMS IN A DESIRED ORIENTATION AND ASSOCIATED METHODS

(75) Inventors: Sarid M. Shefet, Cary, NC (US); John Michael Phillips, State Road, NC (US); Frank Michael Horvath, Jr., Harmony, NC (US); Lawrence Alan Chandler, Raleigh, NC (US)

(73) Assignee: ConAgra Foods, Inc., Edina, MN (US)

( * ) Notice: Subject to any disclaimer, the term of this patent is extended or adjusted under 35 U.S.C. 154(b) by 3 days.

(21) Appl. No.: 10/635,735

(22) Filed: Aug. 6, 2003

(65) Prior Publication Data

US 2004/0029515 A1 Feb. 12, 2004

Related U.S. Application Data

(62) Division of application No. 10/171,862, filed on Jun. 13, 2002.
(51) Int. Cl.[7] .............................................. A22C 11/00
(52) U.S. Cl. ........................................................ 452/32
(58) Field of Search ......................... 452/30–32, 46–48

(56) References Cited

U.S. PATENT DOCUMENTS

| | | | |
|---|---|---|---|
| 2,697,850 A | 12/1954 | Cross | |
| 3,022,745 A | 2/1962 | Roberts | ........................ 104/99 |
| 3,296,657 A * | 1/1967 | Moekle | ........................ 452/35 |
| 3,533,495 A | 10/1970 | Wallace | |
| 3,808,636 A * | 5/1974 | Gouba | ........................ 452/31 |

(List continued on next page.)

FOREIGN PATENT DOCUMENTS

| | | |
|---|---|---|
| DE | 3137276 | 4/1983 |
| EP | 0399582 | 1/1990 |
| FR | 2088622 | 4/1970 |

OTHER PUBLICATIONS

Article, "Continuous Process Systems", Alkar, http://www.alkar.com (date unavailable; believed to be dated before Mar. 1, 2002) pp. 1–3.
Article, "Batch Ovens", Alkar, http://www.alkar.com (date unavailable; believed to be dated before Mar. 1, 2002) pp. 1–3.

(List continued on next page.)

Primary Examiner—Thomas Price
(74) Attorney, Agent, or Firm—Myers Bigel Sibley & Sajovec PA

(57) ABSTRACT

Methods and devices for loading carrier members with suspended elongated product include straddling suspended elongated product over a carrier member having a width so that portions of the elongated product are serially draped over the carrier member along a desired length thereof and wiping, pushing, or pulling adjacent segments closer together to increase the amount or density of the product on the carrier member. The straddling is carried out so that the draped elongated product defines suspension regions that contact the carrier member intermediate lengths of the elongated product that hang from opposing sides of the carrier member. At least one of the suspended regions on the carrier member is moved in a predetermined direction at a first time then another one of the at least one of the suspended regions on the carrier member is moved in the predetermined direction at a second time. The straddled elongated product is thus arranged so that serially consecutive suspension regions are more closely positioned together on the carrier member based on the first and second moving steps.

20 Claims, 20 Drawing Sheets

U.S. PATENT DOCUMENTS

| | | | |
|---|---|---|---|
| 3,964,129 A | | 6/1976 | Townsend |
| 4,060,875 A | | 12/1977 | Gosling et al. |
| 4,079,666 A | | 3/1978 | Plemons et al. |
| 4,091,505 A | * | 5/1978 | Muller et al. ................. 452/47 |
| 4,112,546 A | | 9/1978 | Muller |
| 4,129,923 A | | 12/1978 | Hoegger ...................... 452/46 |
| 4,218,003 A | | 8/1980 | Plewa et al. .................. 452/31 |
| 4,565,282 A | | 1/1986 | Olsson et al. |
| 4,582,047 A | | 4/1986 | Williams |
| 4,612,684 A | | 9/1986 | Kollross ...................... 452/35 |
| 4,644,607 A | | 2/1987 | Sziede ........................... 17/45 |
| 4,682,385 A | | 7/1987 | Kasai et al. |
| 4,761,854 A | | 8/1988 | Schnell et al. ................ 17/1 R |
| 4,766,645 A | | 8/1988 | Lamartino et al. |
| 4,880,105 A | | 11/1989 | Kasai et al. ............. 198/465.4 |
| 4,997,365 A | | 3/1991 | Lanham |
| 5,049,108 A | | 9/1991 | Staudenrausch |
| 5,078,120 A | | 1/1992 | Hwang |
| 5,098,332 A | | 3/1992 | Handel ........................ 452/46 |
| 5,183,433 A | * | 2/1993 | Townsend et al. ............ 452/51 |
| 5,277,301 A | | 1/1994 | Fenty |
| 5,354,229 A | | 10/1994 | Markwardt et al. ........... 452/51 |
| 5,354,230 A | | 10/1994 | McFarlane et al. ........... 452/51 |
| 5,480,346 A | | 1/1996 | Kasai et al. |
| RE35,259 E | | 6/1996 | Williams |
| 5,788,563 A | | 8/1998 | Nakamura et al. |
| 5,813,907 A | * | 9/1998 | Lebsack et al. ............... 452/32 |
| 5,830,050 A | * | 11/1998 | Nakamura et al. ............ 452/31 |
| 5,921,857 A | * | 7/1999 | Simpson ...................... 452/31 |
| 5,942,265 A | | 8/1999 | Roberds et al. |
| 5,971,842 A | * | 10/1999 | Simpson et al. .............. 452/51 |
| 6,066,035 A | | 5/2000 | Hergott et al. ................ 452/31 |
| 6,071,186 A | | 6/2000 | Shibata et al. |
| 6,123,613 A | * | 9/2000 | Righele ....................... 452/31 |
| 6,213,368 B1 | | 4/2001 | Vermeer et al. ............ 226/104 |
| 6,277,018 B1 | | 8/2001 | Cody et al. ................... 452/51 |
| 6,468,143 B1 | | 10/2002 | White et al. .................. 452/32 |
| 6,523,462 B1 | | 2/2003 | Johnson et al. .......... 99/443 C |
| 6,558,241 B2 | * | 5/2003 | Hergott et al. ................ 452/31 |
| 6,572,465 B2 | * | 6/2003 | Kimura ....................... 452/51 |
| 2003/0171084 A1 | | 9/2003 | Shefet et al. ................. 452/35 |
| 2003/0171086 A1 | | 9/2003 | Shefet et al. ............... 452/177 |
| 2003/0171088 A1 | | 9/2003 | Shefet et al. ............... 452/187 |
| 2003/0190382 A1 | | 10/2003 | Shefet et al. ................. 425/32 |

OTHER PUBLICATIONS

Brochure, "Fessmann Turbornat 7000: Industrial Smoking and Cooking", Fessman Group (date unavailable; believed to be dated before Mar. 1, 2002) pp. 1–8.

Brochure, "Fessmann Smoking Cooking Cooling", Fessman Group (date unavailable; believed to be dated before Mar. 1, 2002) pp. 1–8.

Brochure, "Fossmann Transfer 4000: Continuous Smoking, Cooking and Cooling", Fessman Group (data unavailable; believed to be dated before Mar. 1, 2002) pp. 1–9.

Pictures of the inside of a conventional prior art oven from Alkar.

* cited by examiner

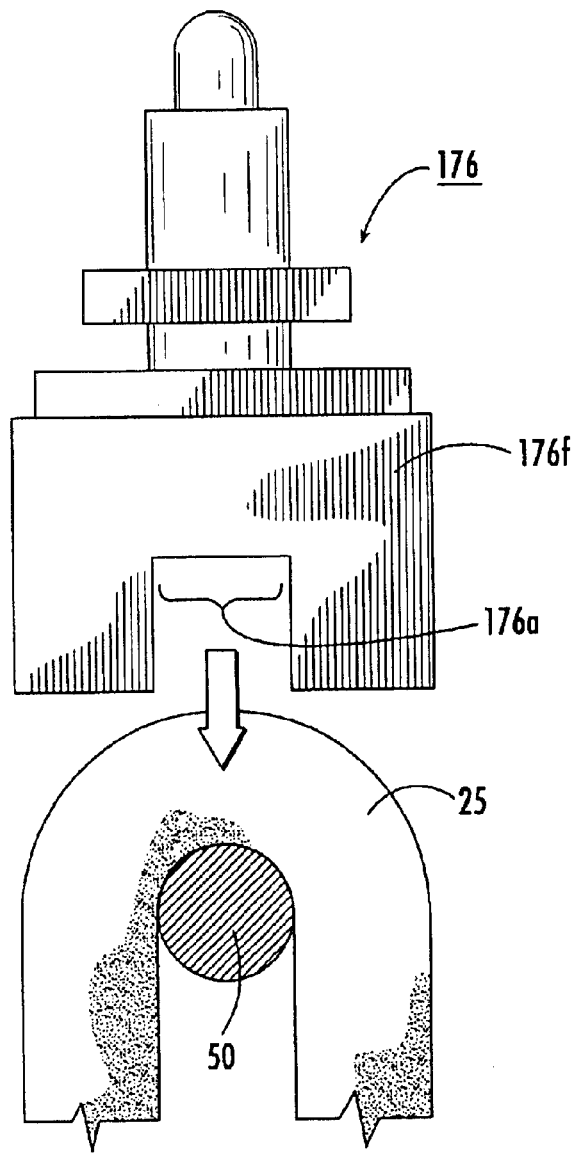
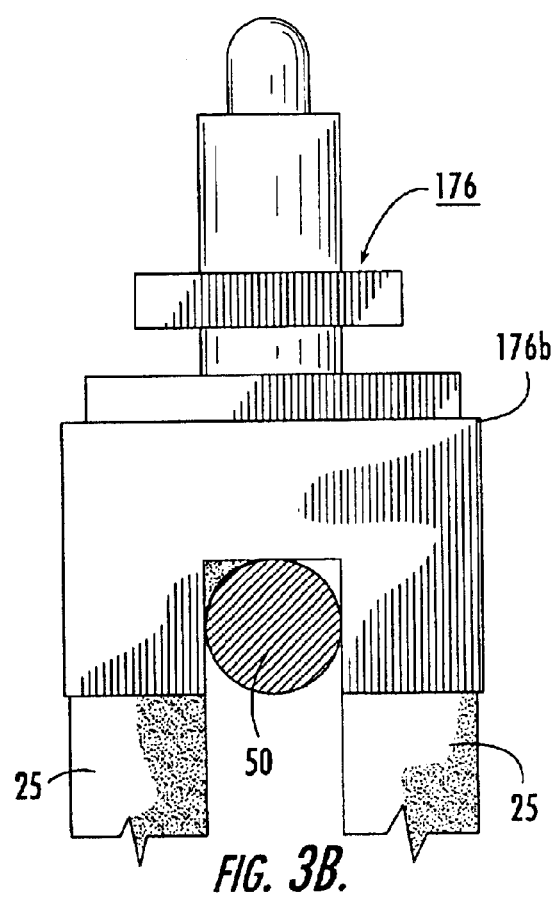
FIG. 3A.
FIG. 3B.

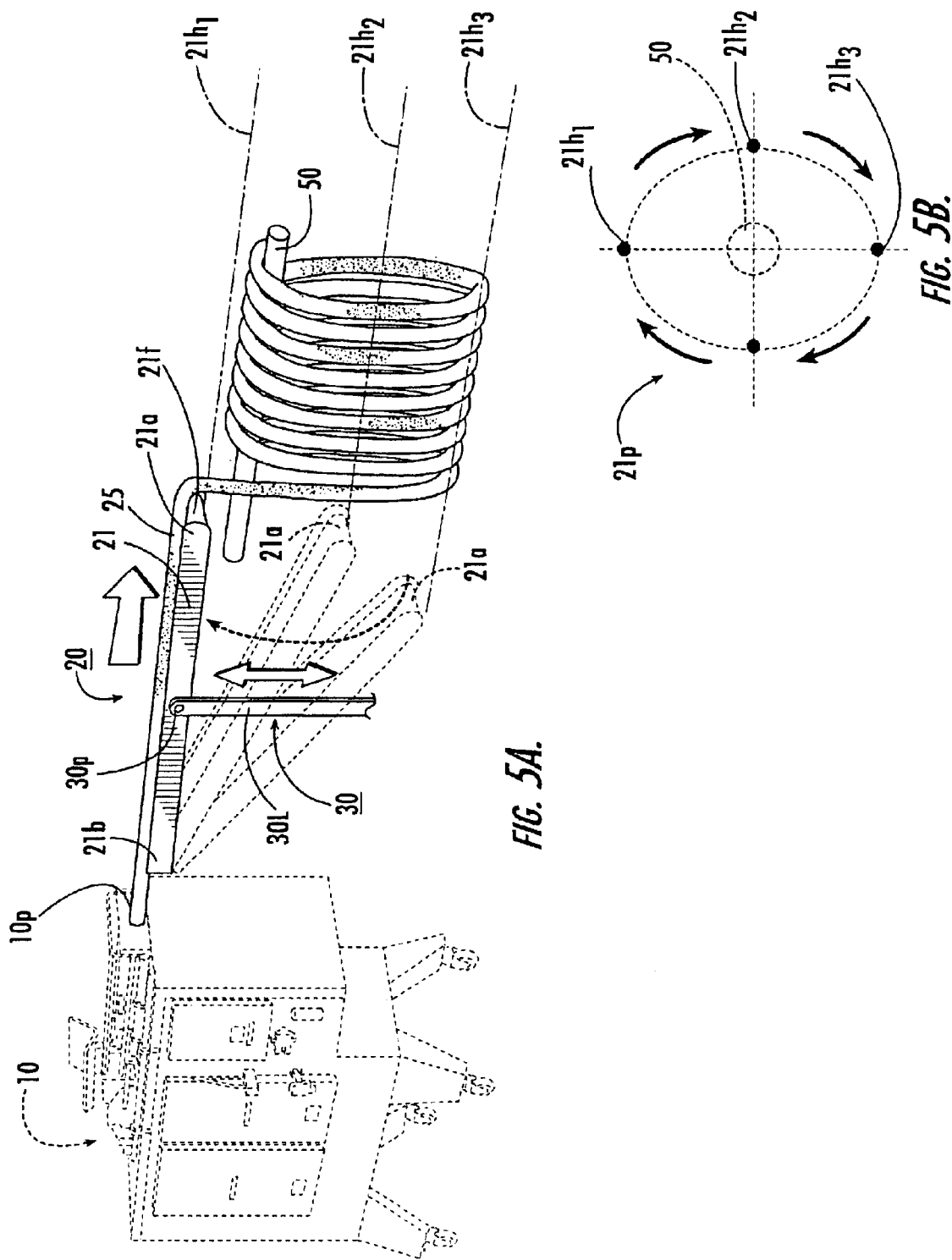

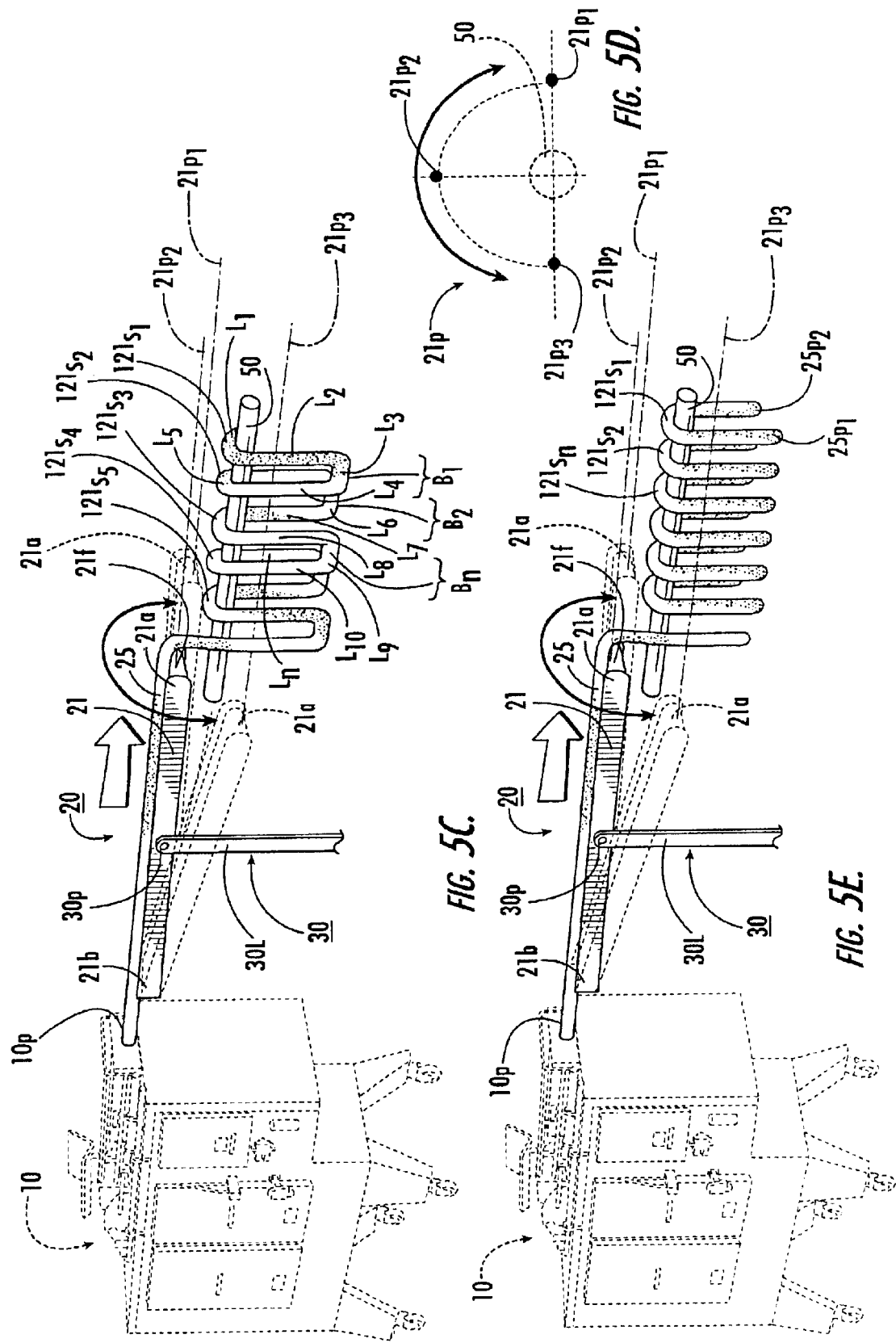

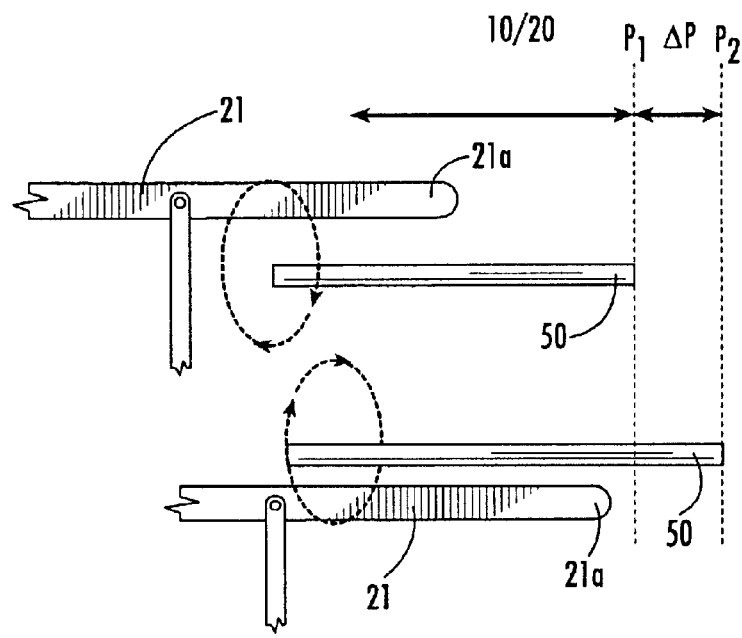
FIG. 6A.
FIG. 6B.
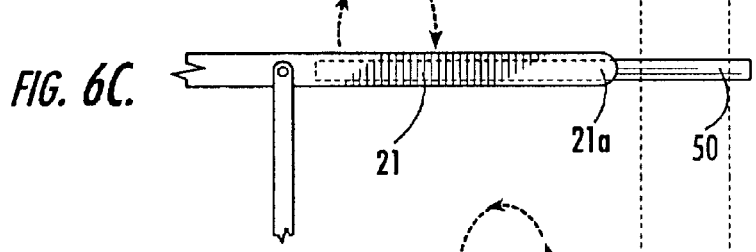
FIG. 6C.
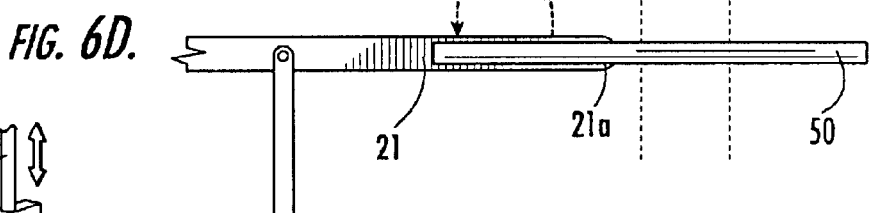
FIG. 6D.
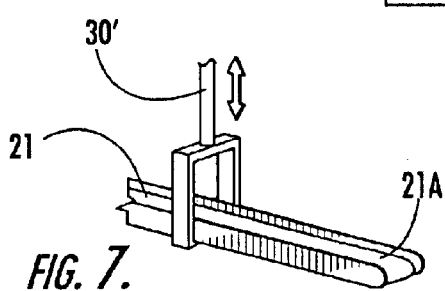
FIG. 7.
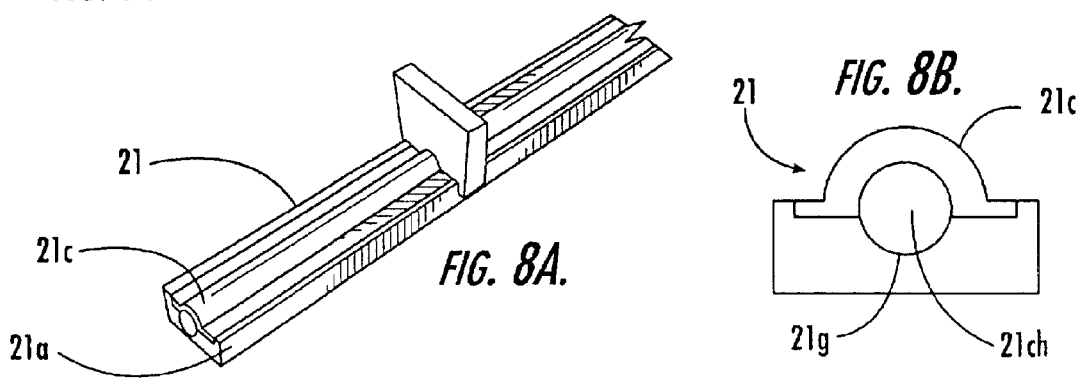
FIG. 8A.
FIG. 8B.

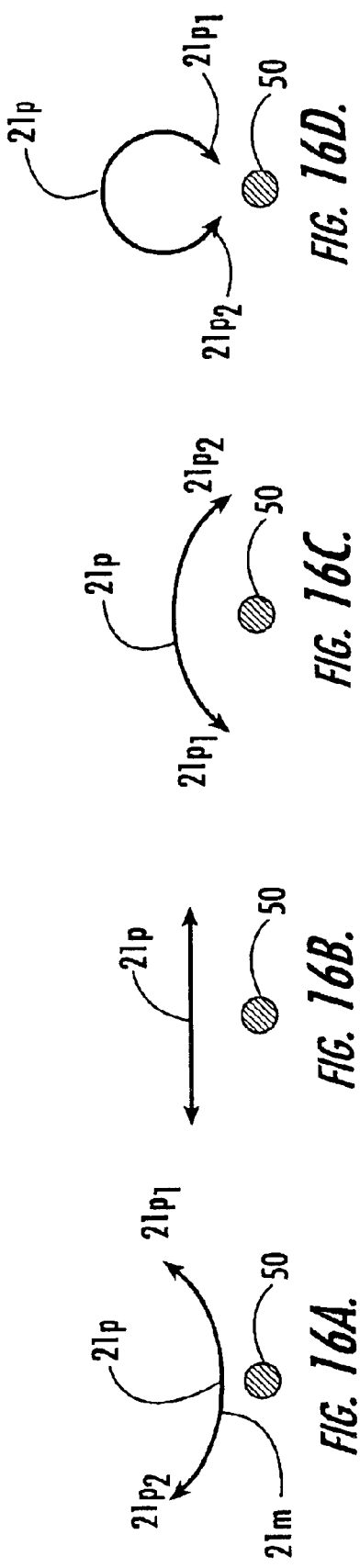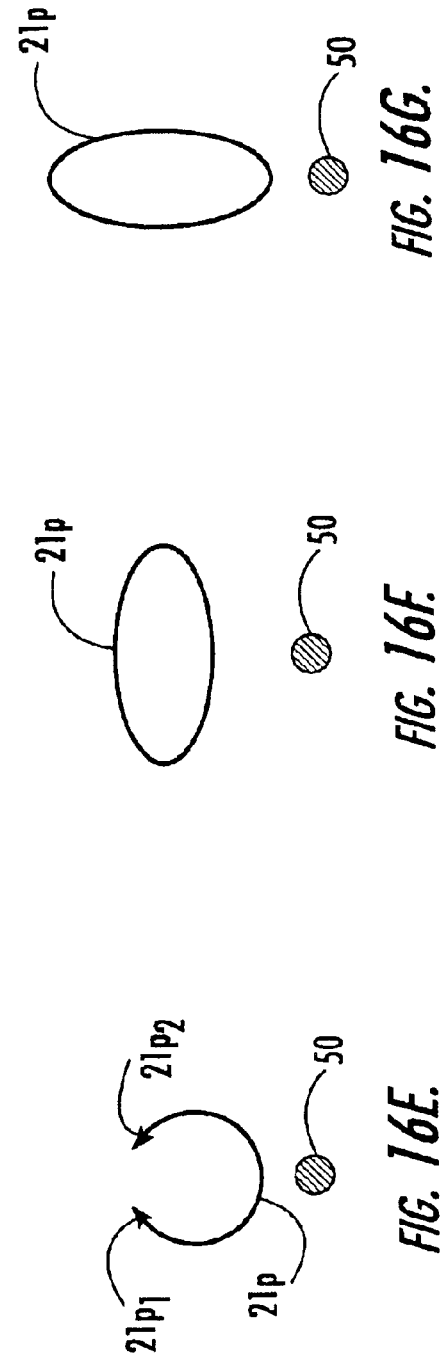

REPETITIVE HIGH-DENSITY PACKING MECHANISMS FOR ARRANGING SUSPENDED LENGTHS OF ELONGATED ITEMS IN A DESIRED ORIENTATION AND ASSOCIATED METHODS

RELATED APPLICATIONS

This application is a divisional of U.S. application Ser. No. 10/11,862, pending filed Jun. 13, 2002, the contents of which are hereby incorporated by reference as if recited in full herein.

FIELD OF THE INVENTION

The present invention relates to handling of products within processing facilities and is particularly suitable for loading lengths of products such as elongated extruded or stuffed food products on carriers in food preparation and production systems.

BACKGROUND OF THE INVENTION

Conventionally, extruded or stuffed food products such as pasta, dough, and meats such as hot dogs, links, or sausages, can be processed so that the desired food material is extruded or mixed and prepared, then propelled through a "stuffer machine" that includes a stuffing nozzle, extrusion machine, or co-extrus on machine. In operation, in certain food items, as the food moves through the stuffin nozzle or extrusion head, a natural or synthetic casing is disposed about and/or deposited or wrapped around the external surface of the food material to form a continuous length of encased elongated food product. To form certain products (such as hotdogs and sausages), the casing can be twisted, tied, nipped, and/or crimped at certain intervals, forming a chain-like string or strand of encased food product. Extruders and co-extruders are available from various commercial manufacturers including, but not limited to, Townsend Engineering Co., located in Des Moines, Iowa. Stuffers are available from various commercial manufacturers including, but not limited to, HITEC Food Equipment, Inc., located in Elk Grove Village, Ill., Townsend Engineering Co., located in Des Moines, Iowa, Robert Reiser & Co., Inc., located in Canton, Mass., and Handtmann, Inc., located in Buffalo Grove, Ill. Exemplary stuffer and/or linker apparatus are also described in U.S. Pat. Nos. 5,788,563; 5,480,346; 5,049,108; and 4,766,645. The contents of these patents are hereby incorporated by reference as if recited in full herein.

After stuffing or extruding, the encased elongated food product is expelled from the stuffer or extruder via a material discharging exit port. FIG. 1A illustrates a conventional stuffer 10 and stuffer material discharge port 10*p*. The stuffer discharge port 10*p* is positioned proximate a "linker" or looping and transferring device 15 (FIG. 1B) that rotates an endless chain of hooks 15*h* about the discharge port 10*p*. Generally described, the material discharge port 10*p* is configured so that, during operation, the product is expelled and directed so that the traveling hooks, which serially travel to be adjacent the discharge port 10*p*, catch a portion of the length of the product, with the result that the product forms loops on the hooks at certain intervals. More specifically, certain devices are configured so that the hooks 15*h* travel to the discharge port 10*p* and the discharge port 10*p* discharges into a downwardly inclined channel that directs the elongated food downward and, as the hooks turn to face the discharged food, the hooks sequentially individually reach out to grasp the product at certain intervals. Other devices propel the encased product onto hooks that rotate thereabout (typically under) to catch the product at certain intervals to transfer the encased material onto the transfer device. The hooks 15*h* then suspend the product in a looped configuration (hanging in a vertical orientation) as shown in FIG. 1B, with each hook 15*h* supporting a single loop of product.

FIG. 1C illustrates a slightly different prior art stuffer 10 and associated linker 15 with hooks that are oriented to rotate in a different plane from that shown in FIG. 1A (i.e., a vertical plane rather than a horizontal plane). In addition, in this prior art stuffer/linker, the discharge port 10*p* terminates into a short expanse of tubing that forms a rotating discharge nozzle 10*r*. The rotating nozzle 10*r*, again, propels the extruded encased product onto the hooks 15*h*.

After the product is suspended on the hooks 15*h*, a rod or stick is typically manually inserted through the suspended looped product above the hooks and below the upper looped portion of the food, and the product is manually lifted up and off the hooks 15*h* and transferred to a trolley, oven, or other food processing station.

In view of the foregoing, there is a need to provide automated processing systems that can improve the production process to facilitate the loading of food receiving members such as sticks and/or reduce the need for manual labor to load sticks and/or that can more controllably transfer strands of elongated items in an automated manner.

SUMMARY OF THE INVENTION

The present invention provides automated winder systems, methods, and devices that can automate the loading of extruded or stuffed product in a desired increased density packing arrangement onto a carrier or transfer support member such as a stick or rod. The automated winders can be configured to remove the need for a hook-based continuous looping system, and/or manual insertion of rods to lift the looped product onto the rods, from the production process. Indeed, in particular embodiments, the automated winder can load the elongated product in a desired packing density directly onto a stick or desired support transfer or carrier member that can then be used to transfer the product to (and/or through) the next processing station (such as a smoker, oven, curer or the like).

Certain embodiments of the present invention are directed to methods for loading carrier members with suspended elongated product. The methods can be carried out to wipe, push, or pull adjacent segments of the suspended product closer together to increase the amount or density of the product loaded or held on the carrier member.

Certain embodiments are directed to high-density packing mechanisms and methods with a packing arm that extends and retracts repeatedly about a portion of the length of the carrier member thereby sweeping or pushing adjacent segments of suspended product closer together on the carrier member. The carrier member can be moving (forward or rearward) as the packing arm extends and retracts so that the packing arm reaches over different portions of the carrier member at each revolution or cycle of the extend and retract movement. This can allow the packing arm to pack the suspended product in a high-density closely spaced substantially evenly distributed arrangement over a desired length of the carrier member.

and y-axis directional components. The transfer or carrier member may be configured to (linearly) translate as the winder arm translates (moved either forward or backward toward or away from the stuffer discharge port) so that the automated winder can load, straddle-wrap or loop, the released product starting at one end portion of the transfer member and terminating at the opposing end portion so that substantially the entire length (or a desired length) of the transfer member is covered with a continuous length of straddled and/or looped product. As one or more segments of the product is held draped or suspended from the carrier or transfer member, a packing mechanism having an extending and retracting arm can extend about the carrier member to direct at least one of the draped segments to move in a desired direction on the carrier member to position adjacent segments of the suspended product closer together. The packing mechanism can repeat this motion a plurality of times as the carrier member linearly moves to serially contact spatially separate portions of the carrier member and different draped segments of the product during the packing or loading operation.

The packing mechanism can be automatically or manually operated. For automated versions, the packing arm can be driven by an electric motor that causes the arm to move continuously in a closed path that serially causes the packing arm to extend in an upstream direction above the carrier member, decline or lower to contact the carrier member and push the adjacent food segment in a forward direction, rise to move above the carrier member, and then return to the extended position above the carrier member, et seq., thereby repeating the cycle.

Certain embodiments of the present invention are directed to methods for loading a carrier member with suspended elongated product, including: (a) straddling suspended elongated product over a carrier member having a width so that portions of the elongated product are serially draped over the carrier member along a desired length thereof, the straddling being carried out so that the draped elongated product defines suspension regions that contact the carrier member intermediate lengths of the elongated product that hang from opposing sides of the carrier member; (b) moving at least one of the suspended regions on the carrier member in a predetermined direction at a first time; then (c) moving another one of the at least one of the suspended regions on the carrier member in the predetermined direction at a second time; and (d) arranging the straddled elongated product so that serially consecutive suspension regions are more closely positioned together on the carrier member based on the first and second moving steps.

Other embodiments of the present invention are directed to automated high-density repetitive packing mechanisms for arranging suspended elongated product on a carrier member. The packing mechanism comprises: (a) an elongated packing arm having an associated length and opposing first and second end portions, wherein, in operation, said first end portion is attached to a fork member that is adapted to periodically contact a portion of a suspended elongated item held on a carrier member; and (b) a drive mechanism attached to the second end portion of the packing arm to repeatedly move the packing arm in a predetermined motion so that the fork member serially moves in a cycle that includes moving in a first longitudinal direction, stalling for a desired interval of time, traveling down a desired vertical distance sufficient to cause the fork member to engage with the carrier member, moving in a second longitudinal direction opposite the first longitudinal direction with the fork member substantially horizontal and parallel to the carrier member, then rising a distance to reside above the carrier member.

The system may be arranged so that over a desired time period, the packing mechanism is substantially continuously operated to serially load a plurality of carrier members and/or transfer support members. Further, in certain embodiments, the carrier member or transfer support member is a stick or rod that can be used to support the elongated product at the next active workstation that may be an oven, a smoker, a curer, or other food preparation/processing station.

These and other objects and aspects of the present invention are explained in detail in the specification set forth below.

BRIEF DESCRIPTION OF THE DRAWINGS

FIG. 3A is an enlarged front view of the end portion of the packing mechanism shown in FIGS. 2A–2F positioned relative to an underlying carrier member according to embodiments of the present invention.

FIG. 3B is an enlarged front view of the end portion shown in FIG. 3A with the device translated a distance down so as to engage with the carrier member in front of (or behind) a selected region of suspended elongated product according to embodiments of the present invention.

FIG. 5A is a side view of a portion of an automated winder according to embodiments of the present invention.

FIG. 5B is a schematic illustration of an exemplary motion pattern of the arm of the automated winder of FIG. 5A according to embodiments of the present invention.

FIG. 5C is a side view of a portion of an automated winder similar to that shown in FIG. 5A illustrating a different winding pattern according to embodiments of the present invention.

FIG. 5D is a schematic illustration of an exemplary motion pattern of the arm of the automated winder of FIG. 5C according to embodiments of the present invention.

FIG. 5E is a side view of a portion of an automated winder similar to that shown in FIGS. 5A and 5C illustrating yet another different winding pattern according to embodiments of the present invention.

FIG. 6A is a schematic illustration of a portion of the automated winder illustrated in FIG. 5A showing the winder arm above the loading stick or receiving member.

FIG. 6B is a schematic illustration of a portion of the automated winder illustrated in FIG. 5A showing the winder arm below the loading stick or receiving member.

FIG. 6C is a schematic illustration of a portion of the automated winder illustrated in FIG. 5C showing the winder arm at a first position with respect to the loading stick or receiving member.

FIG. 6D is a schematic illustration of a portion of the automated winder illustrated in FIG. 5C showing the winder arm at a second position with respect to the loading stick or receiving member.

FIG. 7 is a partial perspective view of a portion of the winder arm of the winder of FIG. 5A with the winding mechanism attached above the winder arm according to embodiments of the present invention.

FIG. 8A is a top perspective view of a portion of a winder arm illustrating an enclosed chute or channel according to embodiments of the present invention.

FIG. 8B is an end view of the winder arm shown in FIG. 8A.

FIGS. 16A–16G are schematic front views of illustrations of exemplary winding patterns that may be used to wrap or position product onto a receiving member according to embodiments of the present invention.

DESCRIPTION OF EMBODIMENTS OF THE INVENTION

Figure 1A:
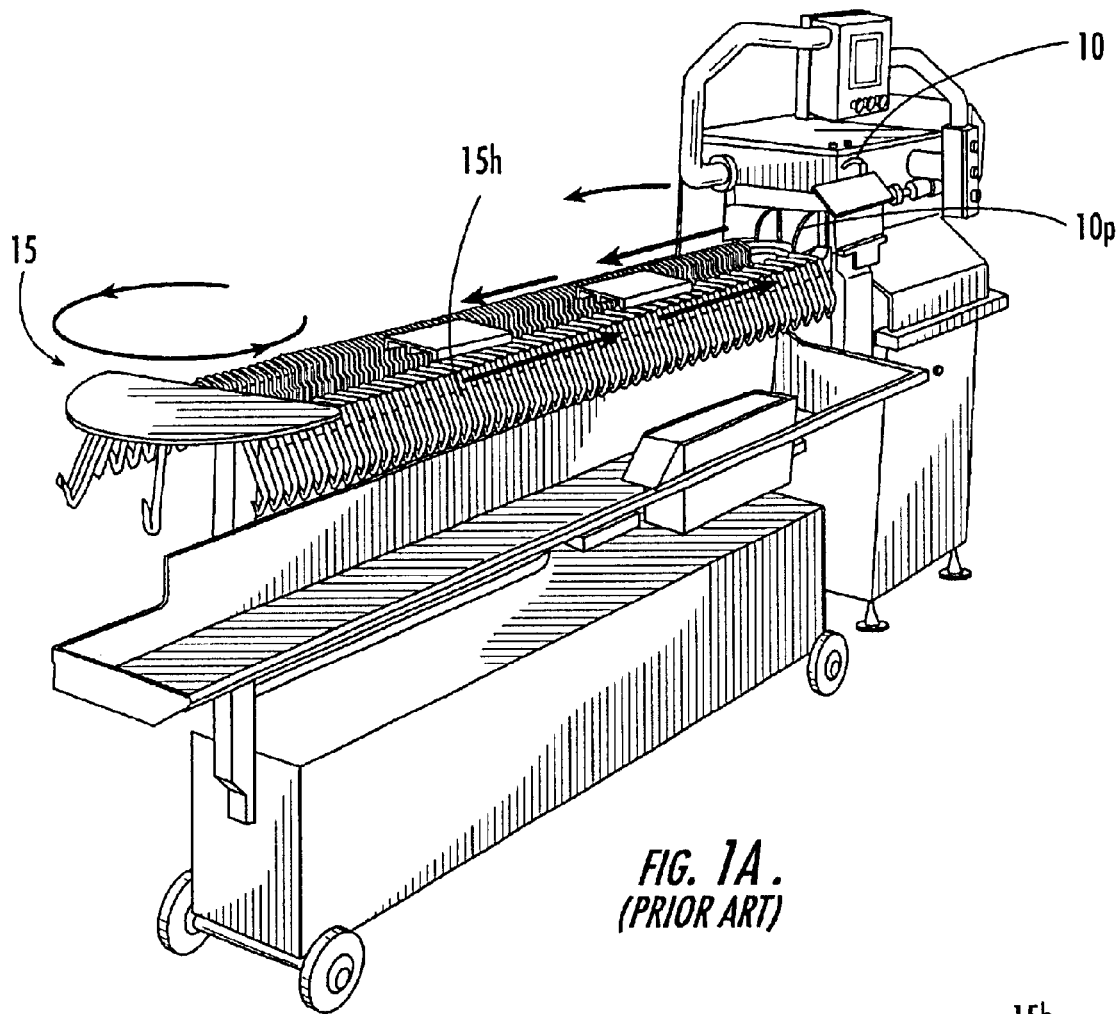
FIG. 1A is a perspective view of a prior art extruded food stuffer and associated linker or transferring and looping device.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the claims unless specifically indicated otherwise. Where used, the terms "attached", "connected", "contacting", and the like, can mean directly or indirectly, unless stated otherwise.

In the description of the present invention that follows, certain terms are employed to refer to the positional relationship of certain structures relative to other structures. As used herein, the term "forward" and derivatives thereof refer to the general or primary direction that food travels as it moves inside a food processor from a processing point or region to the next processing point or region; this term is intended to be synonymous with the term "downstream," which is often used in manufacturing environments to indicate that certain material being acted upon is farther along in the manufacturing process than other material. Conversely, the terms "rearward" and "upstream" and derivatives thereof refer to the directions opposite, respectively, the forward and downstream directions.

The devices and methods of the present invention may be particularly suitable to pack and/or load elongated food items onto a support or carrier member that can be used to transport, carry, or move the elongated food items to the next desired work or processing station. Elongated food items include, but are not limited to, elastic or partially elastic food items such as cheese (e.g., mozzarella strands), dough (such as for incubation), meat sticks or strands, pasta, licorice or other strands of candy, and meat products. Of course, the processing system can be configured to wind or transfer other items. For example, other elongated products include candles, ropes, string, cables, chain, wires, hose, tubing, and the like.

In certain embodiments, the present invention is used to process and/or transfer or load a length of an elongated extruded product held in a casing onto a support member. The casing can be any suitable casing (edible or inedible, natural or synthetic) such as, but not limited to, collagen, cellulose, plastic, elastomeric or polymeric casing. The elongated product can be an elongated meat product. Exemplary meat products include, but are not limited to, strands of meat (that may comprise pepperoni, poultry, and/or beef or other desired meat), processed meat products such as strand(s) or continuous lengths of meat sticks (including whole or partial meat mixtures), sausages, hotdogs, and the like. The term "continuous" is used interchangeably with "contiguous" to mean that the product is connected or joined (directly or indirectly) over its length.

The elongated product can be configured as a continuous length of product having a length of at least about 20–25 feet per strand, and typically at least about 50 feet. In other embodiments, the length of the continuous product may be up to about 150–200 feet, or even longer. The elongated product may be segmented or non-segmented, i.e., a length of chain-like linked items, or a strand or multi-stranded length of non-chain linked product. Other embodiments may load the elongated product in a series of non-looped discrete lengths. The discrete lengths may be any desired length or combinations of lengths, such as, but not limited to, lengths between about 1–20 feet.

The elongated food item may be elastic (at least in tension) so as to allow some stretching without unduly altering or deforming its desired shape and/or cross-section during processing. The elongated food item may be an extruded product that is held in a natural or synthetic casing as noted above. Other embodiments contemplate product that have rigid configurations but are movable link to link, such as chains of material having sufficient rigidity to retain its shape during processing and/or use (such as those objects formed of sufficient thickness or structure to provide a solid, semi-solid, or hollow length of material). The material may be a composite resin, metal, polymer, elastomeric and/or plastic material, combinations of the same, and the like.

In operation, in certain embodiments, the elongated product may have an exterior surface that, during the loading process, exhibits increased friction relative to a finished, cured, or dried configuration. For example, a processed meat mixture that is held in a collagen casing, prior to finishing, can be described as having a relatively gelatinous, sticky external residue that can cause the food to attempt to stick to a support surface.

Figure 2A:
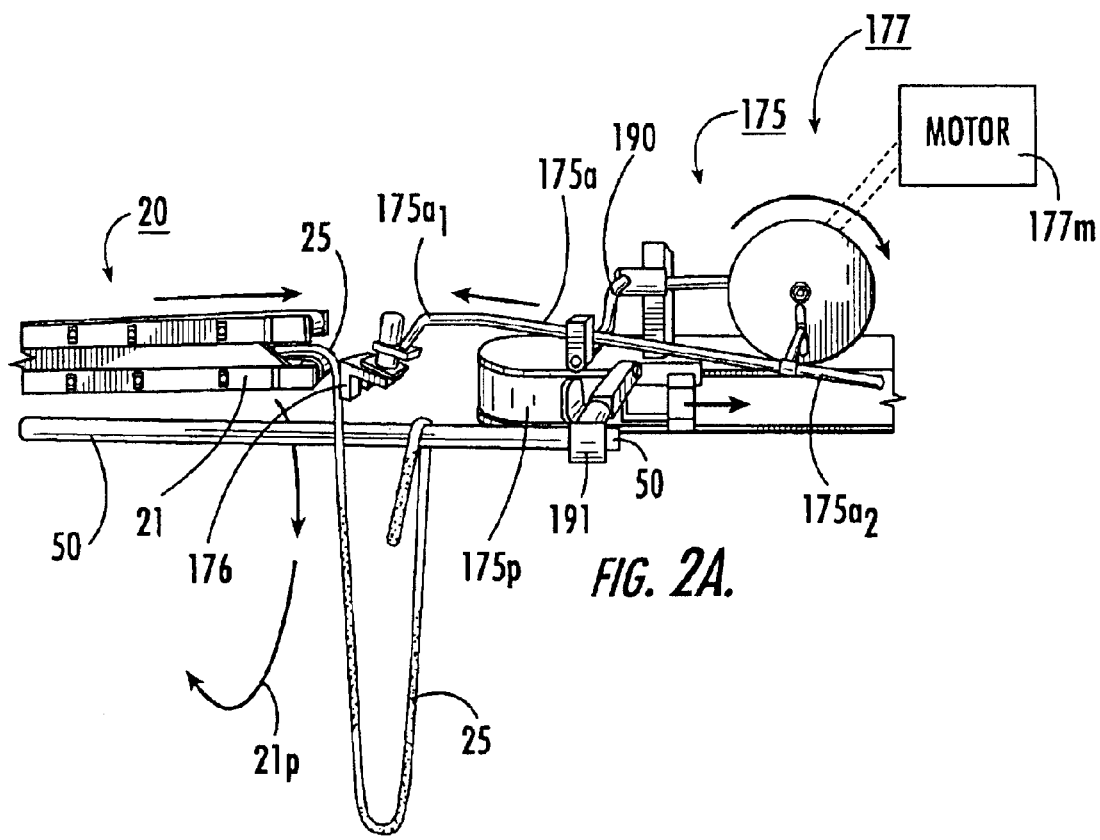
FIGS. 2A–2F are side views of a sequential series of operations used to pack product in close proximity according to embodiments of the present invention.
Figure 4:
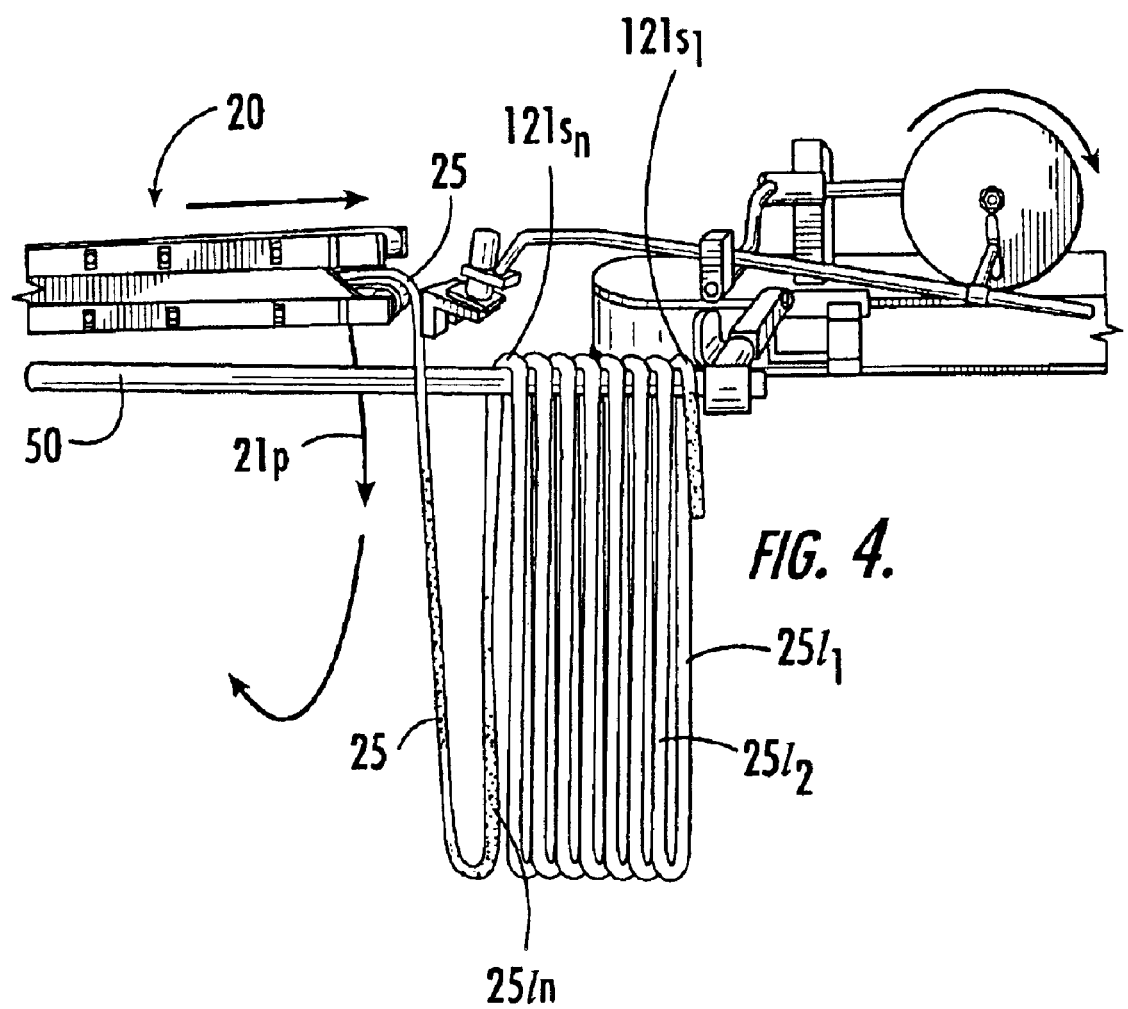
FIG. 4 is a side view of the device shown in FIGS. 2A–2F illustrating a more fully loaded carrier member with a plurality of closely spaced suspended regions held on the carrier member according to embodiments of the present invention.

FIGS. 2A–2F illustrate a sequence of operations that can be carried out to arrange suspended elongated product on a carrier member 50 according to embodiments of the present invention. As used herein, the term "transfer support member" is used interchangeably with the term "carrier member." As shown in FIG. 2A, a packing mechanism 175 is cooperably aligned with a carrier member 50 that is, in turn, cooperably aligned with an automated winder 20. The automated winder 20 includes a winding arm 21 and has an associated winding or motion pattern 21p that discharges and loads suspended elongated product onto a cooperably aligned carrier member 50 and is discussed in more detail below with reference to FIGS. 5 et seq. The carrier member 50 is loaded with at least one length of elongated product 25. As shown, the product straddles onto the carrier member 50 so that the product defines suspension regions $121S_1$–$121S_n$. The straddling can be carried out in different manners to load, suspend, hang, or drape the product 25 onto the carrier member 50. For example, as shown in FIG. 4, the straddling is performed so that the product 25 is arranged in a plurality of loops on the carrier member 50. FIG. 5C illustrates that the straddling configuration can be a continuous length of non-looped bights $B_1$, $B_2$ . . . $B_n$ having a series of curves while FIG. 5E shows discrete lengths of products hanging from the carrier member 50.

In any event, the packing mechanism 175 includes an elongated packing arm 175a that moves through a repeating motion cycle illustrated by the arrows proximate the packing arm 175a in FIGS. 2A–2F. The packing arm 175a includes opposing first and second end portions $175a_1$, $175a_2$, respectively. The first end portion $175a_1$ can be formed as or include a fork member 176 that, in operation, periodically reaches over and down to contact the outer surface of the carrier member 50 (FIGS. 3A, 3B) and/or a portion of a suspended elongated product 25 held on a carrier member 50 to swipe, move, push, or pull regions of the product 25 in a desired direction on the carrier member 50 to provide a more closely spaced or symmetrical or desired loading/packing arrangement.

Figure 2B:
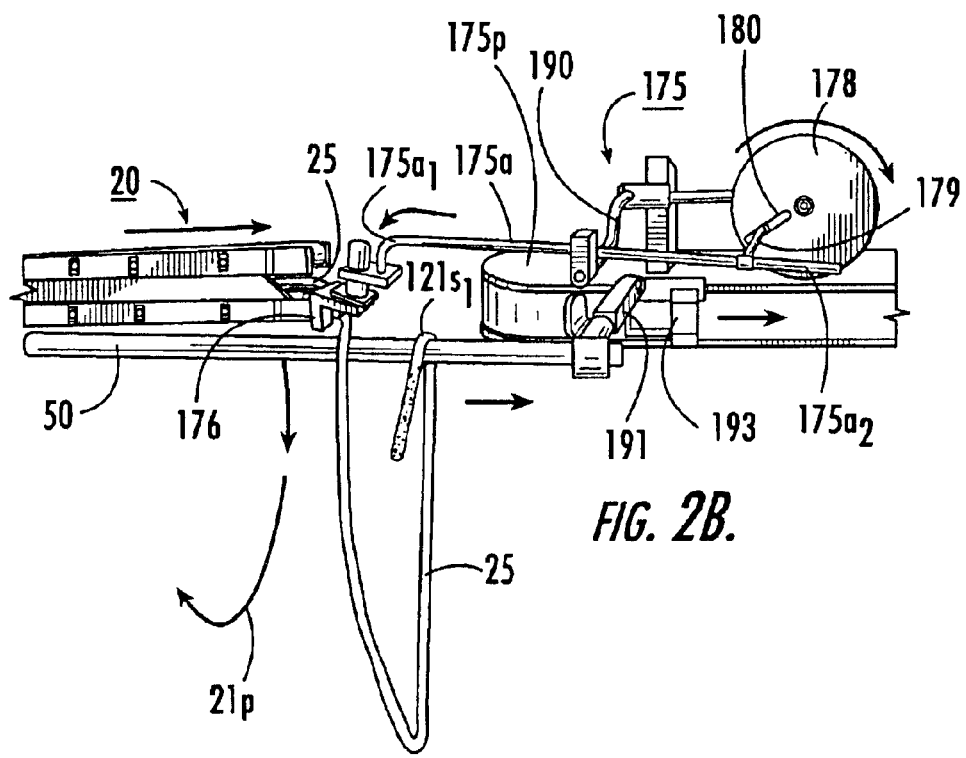
Figure 2C:
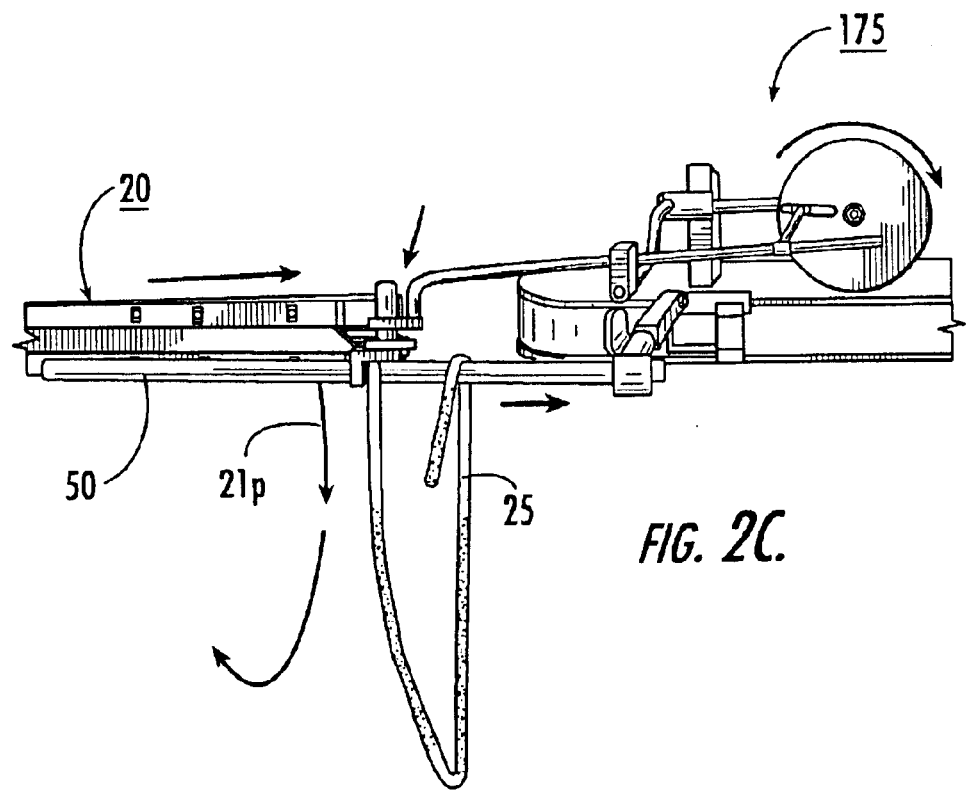
Figure 2D:
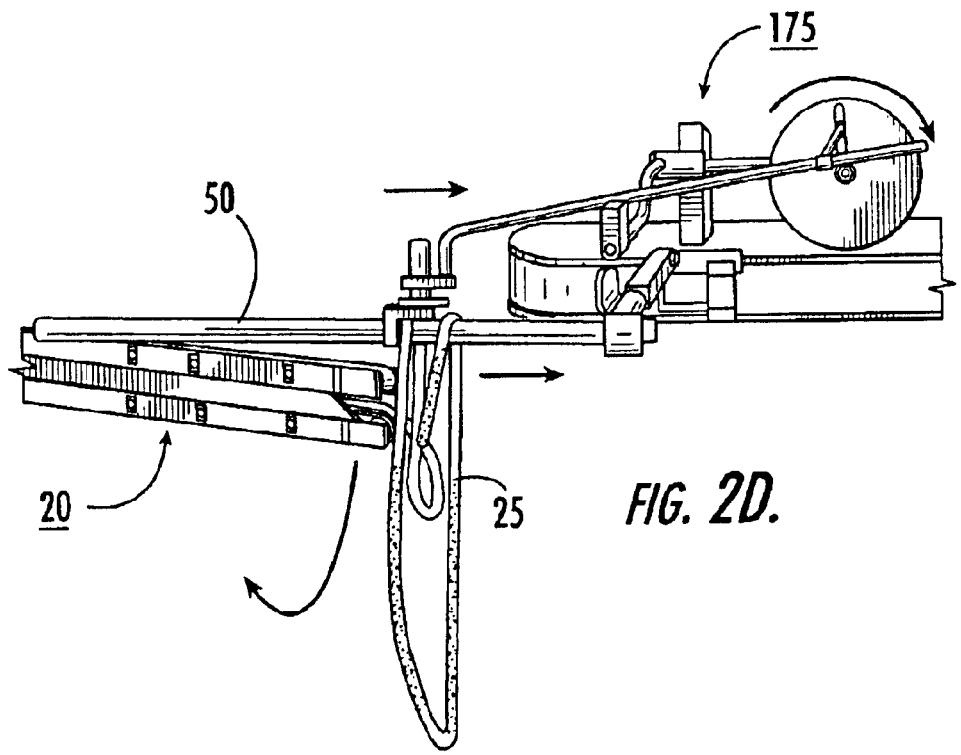
Figure 2E:
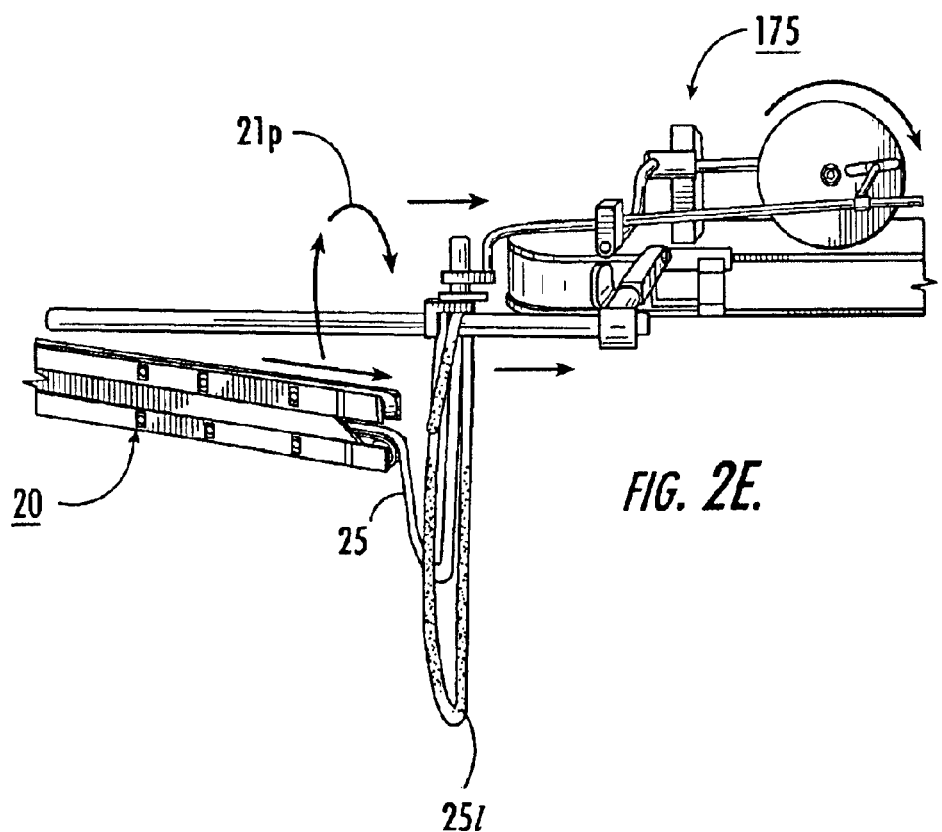
Figure 2F:
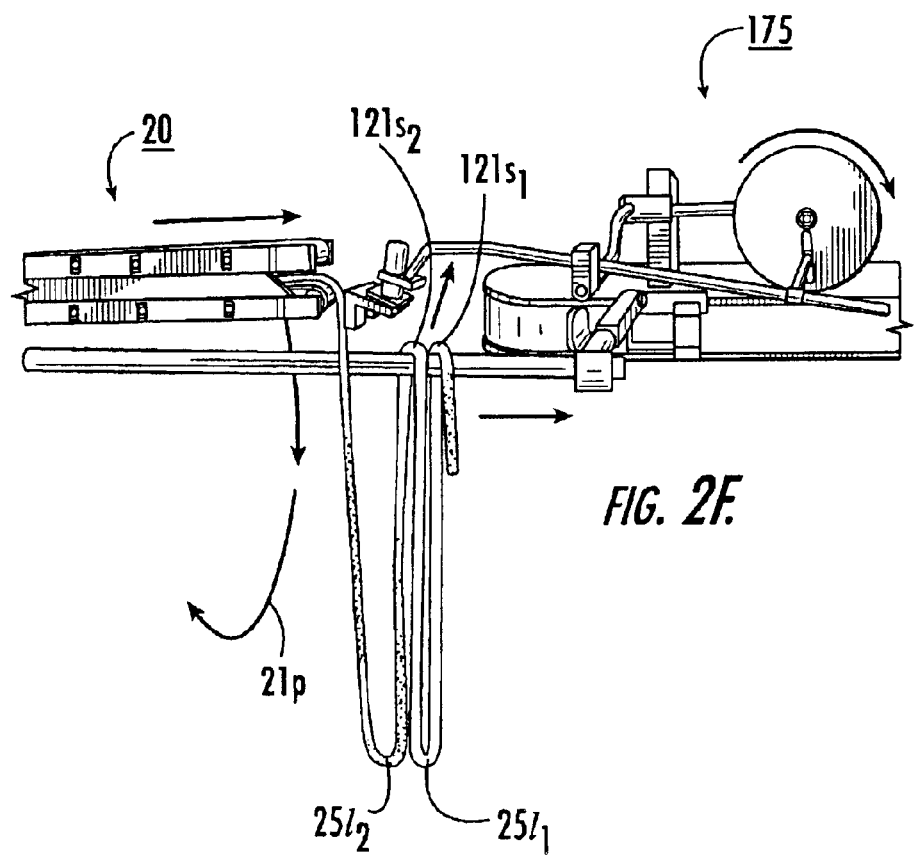

As shown in FIGS. 2A–2F, the packing mechanism 175 also includes a drive mechanism 177 attached to the second end portion of the packing arm $175a_2$ to repeatedly move the packing arm 175a through a predetermined motion cycle so that the fork member 176 serially moves through its travel cycle. The drive mechanism may be automatically or manually operated. FIG. 2A illustrates that the drive mechanism 177 can be operably associated with an automated drive means such as a motor 177m. As shown by the sequence in FIGS. 2A–2F, the cycle sequence may be such that the fork member 176 moves in a first longitudinal direction (shown in the rearward substantially longitudinal direction in FIG. 2A), travels down a desired vertical distance sufficient to cause the fork member 176 to engage the carrier member 50 (FIGS. 2B, 2C and 3A, 3B), moves in a second longitudinal direction opposite the first longitudinal direction with the fork member substantially horizontal (FIGS. 2D, 2E), then rises a distance to reside above the carrier member 50 (FIG. 2F). The arm 175a and the fork member 176 may be configured to stall for a desired interval of time during a portion of the cycle, typically after they rise (FIG. 2F) and before they descend again (FIG. 2B). The stall or static interval can be timed to define when the fork member 176 will next contact the carrier member 50. The stall interval can depend on the discharge speed of the product 25 from the winder mechanism 20, the speed of the winder 20 as it moves through its winding path 21p and the number of times it is desired for the fork member 176 to contact the carrier member 50 and/or product 25. For example, in certain embodiments, the winding arm 21a may be configured to operate with a pause of about 0.5–2 seconds at one or more locations in its travel path, as the winding arm 21a (FIG. 5A) moves about the carrier member 50. In other embodiments, increased stall times can be used, while in still other embodiments no stall time is used as the amount or speed of drag or movement of the fork member 176 can be timed to continuously move through its operative positions in a variable or constant speed. Combinations of variable speeds, constant speeds, and the use of stall intervals may also be used depending on the application.

For example, the carrier member 50 can be loaded by having the winding arm 21a present the product onto the carrier member 50 so that it is straddled in a desired suspended configuration. The straddling operation has an associated speed that is dependent upon the discharge rate of the product 25 from the winder 20 and the speed of movement of the winder arm 21a about the carrier member 50. Similarly, the packing arm 175a also has an associated speed. The packing arm 175a speed can be adjusted based on the speed of the straddling operation so that it does not disrupt the loading and can move the product 25 at desired intervals during the loading cycle.

In operation, in certain embodiments, the straddling operation is carried out by the winding arm 21a as it travels in a predetermined pattern and discharges food 25 therefrom in a forward direction while the winding arm 21a is traveling through its pattern 21p. The packing arm 175a can be configured to move rearward and forward in a repetitive packing cycle. That is, the repetitive packing cycle can be performed so that the packing arm 175a serially moves in a rearward direction above the carrier member 50 relative to the direction of the discharged food, then stops for a static interval before it declines to contact the carrier member 50 and moves forward thereby pushing the suspended region in back 176b of the packing arm 175a forward, and then rises to complete a packing cycle.

In certain embodiments, the carrier member 50 can be translated forward during the operation of the packing mechanism 175. In this situation, the fork member 176 can sequentially engage different segments of the product and/or different locations of the carrier member 50 to thereby arrange different portions of the product to be closer together. The carrier member 50 is shown as moving forward (horizontal arrows proximate the carrier member 50 in FIGS. 2B–2F) with the packing arm 175a also moving or pushing the suspended product forward on the carrier member 50 itself. However, the movement of the arm of the mechanism 175a and translation of the carrier member 50 can be reversed. In addition, in lieu of moving the carrier member 50, the winding arm 21 of the winder 20 and the packing mechanism 175 can be moved with the packing mechanism being stationary to distribute elongated product over a desired length of the carrier member 50.

Further, in certain embodiments, instead of positioning the packing mechanism 175 in front of (downstream of) the winding arm 21 as shown, the packing mechanism 175 may be placed to the side or rear of the winding arm 21 and be configured to reach in and periodically push, pull or move the suspended product forward or rearward on the carrier member 50 (not shown).

FIGS. 2A and 2B illustrate that the winding mechanism 177 can be mounted to a platform 175p that holds at least a portion of the mechanism 177 thereon. As shown, the platform 175p includes an upper bracket 190 that holds the packing arm 175a in a manner that allows the packing arm 175a to pivot thereon. The platform 175p can also include a lower bracket 191 that can hold an edge portion of the carrier member 50. The lower bracket 191 may be operably associated with a drive track 193 mounted on the platform 175p that automatically positions the carrier member 50 at the packing station and/or moves the carrier member 50 forward at a desired speed during the packing operation. For additional discussion of suitable take-away and loading systems using drive tracks, see co-pending U.S. Provisional Patent Application Serial No. XXXX, filed Apr. 8, 2002, identified by Attorney Docket Number 9281-4PR, the contents of which are hereby incorporated by reference as if recited in full herein.

As shown in FIGS. 2A and 2B, in certain embodiments, the drive mechanism 177 can be a four-bar linkage mechanism that includes a rotatable wheel 178 that can be mounted to the platform 175p. The wheel 178 can be powered to be automatically driven by a shaft connected to a motor as shown schematically in FIG. 2A. The wheel 178 can be substantially continuously operated so as to repeat the packing cycle(s) a plurality of times for each carrier member 50 presented to the packing arm 175a. The wheel 178 is connected to a linkage 179 that may travel in a restrained slot 180 formed in the wheel 178. The linkage 179 is attached to the arm 175a. In operation, as the wheel 178 rotates, the linkage 179 repeatedly follows a defined path (shown by different locations in FIGS. 2A–2E (FIG. 2F shows the position shown in FIG. 2A), and pulls the arm 175a through a desired motion output.

Of course, any suitable mechanisms and/or components can be employed, including, but not limited to, cam/follower arrangements, pistons (pneumatic or hydraulic), combinations of differently configured linkages with any of the above as well as other electromechanical configurations that can generate the desired repeated motion.

The packing arm 175a may be configured to directly contact each suspended region $121S_1$ through $121S_n$ (FIG. 4) or only selected ones of the suspended regions. The packing arm 175a may be operated to move groups of suspended regions in a desired direction on the carrier member 50 or a selected suspended region independently of the others. In certain embodiments, the packing arm 175a repeatedly moves to push serially successive spaced-part suspended regions forward along the carrier member 50. In other embodiments, the packing arm 175a pushes non-serially successive spaced-apart suspended regions forward along the carrier member 50.

The product 25 may be arranged in a looped (FIGS. 4, 5A) or non-looped (FIGS. 5C, 5E) configuration on the carrier member 50 as will be discussed further below. FIG. 4 illustrates that a continuous length of elongated product 25 is suspended with substantially even lengths $25l_1, 25l_2, 25l_n$ of product on opposing sides of the carrier member 50 over a desired length of the carrier member 50. Other product loading or draping configurations may also be employed.

FIGS. 3A and 3B illustrate an example of the fork member 176 that is attached to the end portion of the arm 175a. The fork member 176 includes a forward or front surface 176f and a rear surface 176b, and may also include an aperture 176a that is sized and configured to correspond to the width of the carrier member 50. The fork member 176 can be sized so as to rest on the carrier member 50 as it pushes, wipes, and/or moves the product on the carrier member 50. The fork member 176 may directly or indirectly contact the product and/or the carrier member 50. For example, as shown the fork member 176 can snugly abut the carrier member 50 and push the food in the desired direction. The fork member 176 may be formed of stainless steel or other material suitable for processing the product (such as food). Lubricating coatings may be employed to inhibit friction between the fork member 176 and the carrier member 50 and/or product 25. In other embodiments, the fork member 176 may be configured to controllably discharge fluid such as air, water, or other pressure applying means, in a desired orientation to move the product along the carrier member 50 (not shown).

Referring again to FIGS. 3A and 3B, in operation, the fork member 176 travels over the carrier member 50 (FIG. 3A) and then travels down a distance to cooperably engage the carrier member 50 (FIG. 3B) so as to move the product along the carrier member 50 in a desired direction to promote efficient side-by-side abutting placement or closely spaced alignment between adjacent suspended regions $121S_1$, $121S_2$, $121S_n$, as shown in FIG. 4.

Turning now to FIG. 5A, one embodiment of an automated winder 20 is shown. The automated winder 20 includes an elongated arm 21 with first and second opposing end portions 21a, 21b, respectively, and a winding mechanism 30. In this view, the winding mechanism 30 is schematically illustrated by a translation linkage 30L that is attached to the arm 21 in a manner that allows it to repetitively move the arm 21 in a desired translating motion or pattern. At the other end of the translation linkage 30L can be any number of suitable translation generation means as will be appreciated by those of skill in the art. As shown, the arm 21 directs the elongated product 25 onto a desired transport support member 50 (shown as a stick or rod). In operation, a plurality of support members 50 are serially placed in aligned cooperating position with the arm 21 of the winder 20 so that each support member 50 can be successively loaded or wound with looped elongated product 25.

In certain embodiments, the winding mechanism 30 is configured to provide a motion for the arm 21 that includes at least a substantially continuous or repeating motion (open or closed path) as indicated by the solid line arrows positioned proximate the translation linkage 30L. Additionally, the winder mechanism 30 may also be configured to translate in a more complex, multi-directional motion (as indicated by the broken-line arrows shown adjacent the solid-line arrows, the motion may also be include movement that is directionally in and out of the paper "the Z axis"). Thus, as shown by the dotted line arrows adjacent the solid line arrows, the translation linkage 30L may drive the arm 21 to move in a direction which is a closed path including two different axis of travel, typically including both X and Y axis directional components. The closed path may be shaped in any desired suitable configuration, including, but not limited to, an oval, teardrop, circular, elliptical, hourglass, square, or rectangle, so as, in operation, it causes the elongate product to wrap to the desired configuration. Further the winding mechanism 30 may be programmably configured to alter its winding pattern, winding speed, and the like, depending on certain parameters such as the product being processed and/or the loading configuration desired.

By way of illustration, as shown in FIG. 5B, the arm 21 can have a maxima position at a first vertical height $21h_1$, two intermediate positions at a second lesser height $21h_2$ (shown with the arm 21 in dotted line below the maxima height), and a minima position $21h_3$ at still a lesser vertical height (shown with arm 21 at yet another lower position at a minima height). The arm 21 is configured to move a sufficient distance above and below the transport member 50 so as to load or loop the elongate product 25 thereon.

FIG. 5B illustrates but one embodiment of a rotational motion pattern 21p for the arm 21 in which the arm 21 successively moves through a closed path pattern. In certain embodiments, as shown in this figure, the pattern 21p may be substantially elliptical or oval. In this pattern, the arm 21 travels through the intermediate positions both as it is moved and/or rotated in the closed path in the downward and upward directions. In position, the transport member 50 is located within the perimeter of the enclosed closed travel path defined by the translating arm 21. In certain embodiments, the transfer member 50 can be located so that it is centrally located within the boundary of the movement of the arm. In other embodiments, the transfer member is asymmetrically positioned (such as closed to the top, bottom or one side of the arm movement). The direction of travel is shown as clockwise in FIG. 5B, but may be configured to be counterclockwise as well.

Figure 1B:
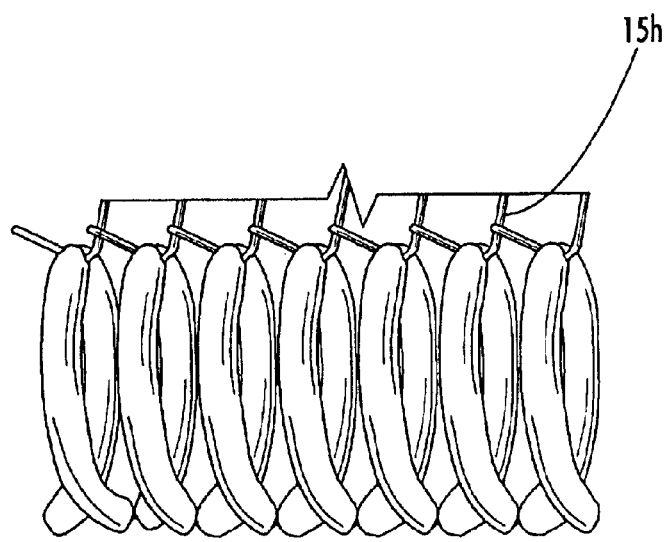
FIG. 1B is an enlarged view of the looping hooks of the device shown in FIG. 1A showing an elongated extruded encased food product suspended thereon.
Figure 1C:
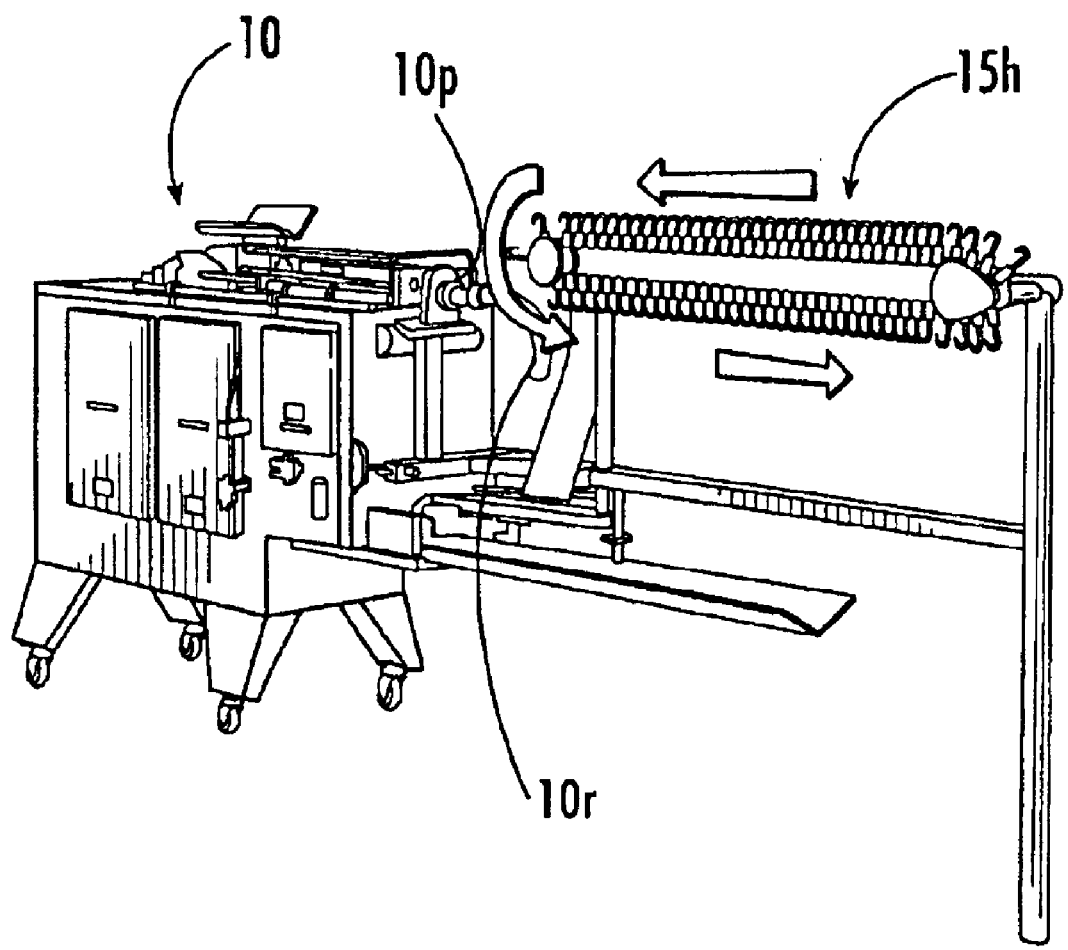
FIG. 1C is a perspective view of another prior art stuffer and linker.

FIG. 5A shows that the first end portion 21a of the arm is positioned a length away from the discharge port 10p of the upstream processing station. As shown, the upstream processing station can be the extruder 10 (such as the conventional extruders shown in FIGS. 1A–1C) and the second end portion 21b of the arm is positioned proximate to, and in cooperating alignment with, a discharge port 10p of the extruder (or stuffer) 10 or intermediately positioned member such as a chute. That is, the second end portion of the arm 21b is positioned so as to receive the elongated product 25 from the upstream device and the opposing (first) end portion 21a is configured to release the elongated product 25 after the product 25 has traveled a desired distance over the length of the arm 21. Typically, the product 25 will travel a major portion of the length of the arm, and more typically, substantially the entire length of the arm 21 before it is released. The product 25 can be released directly from the first end portion 21a, or a discharge nozzle or other discharge port can be attached to the arm 21 and used to dispense the product 25 therefrom.

In operation, the transfer member 50 can be configured to start at a first position that is toward the upstream end 21b of the arm 21 and during loading is gradually retracted or translated to be closer to the downstream end 21a of the arm 21 all at substantially the same vertical height (as shown by the horizontal arrows adjacent the transport member 50 in FIG. 5A). This motion distributes looped product over the desired length of the transport member 50. FIGS. 6A and 6B illustrate the winding translation of the arm 21 with respect to the transport member 50. The transport member 50 is located at a first position $P_1$ and is gradually moved forward to a second position $P_2$ as the arm 21 winds the product 25 thereon. Thus, the transport member 50 moves a distance $\Delta P$.

In certain embodiments, the transport member 50 moves at a substantially constant speed or increments of travel distance that is synchronized and/or responsive to one or more of the speed of the winding (speed of the arm), the speed of forward movement of the product 25 as it exits the arm 21, and the desired looping arrangement/configuration (length of the loops) on the transport member 50. In certain embodiments, the movement of the transport member 50, the winding speed of the arm 21, and/or the speed of the elongate product 25 as it moves off the arm, can vary to provide variable loading density or looping lengths. Thus, the movement distance and speed of movement of the transport member 50 can vary depending on the desired loading of the transport member and winding speed and loop configuration (length, etc.). Typically, the transport member 50 moves a distance that corresponds to a substantial portion of its length (i.e, greater than about 51–75% thereof). Although described as starting from a rearward position and moving forward, the transport member 50 can be configured to move in the reverse direction also.

FIG. 5C illustrates an alternate loading arrangement of the elongated product on the transport or receiving member 50 with an example of an associated winding pattern 21p of the arm 21. As shown, the arm 21 is configured to load the product in a suspended straddled, non-looped configuration (i.e., the product does not double over or loop to cross or close upon itself). As shown in FIG. 5C, one or more one continuous lengths of released elongated product can be loaded onto the transfer support member 50 in response to the release of the product 25 from the moving arm during the translation thereof so that the elongated product 25 is arranged in a straddled configuration with a plurality of adjacently arranged non-looped vertical lengths, such as $L_2$, $L_4$ or $L_5$, $L_7$, hanging on the same side of the transfer support member and a plurality of different adjacent non-looped lengths, such as $L_1$, $L_2$ or $L_4$, $L_5$, hanging on the opposing side of the transfer support member so that the elongated product 25 has a plurality of suspension contact points 121Sn spaced apart about a desired length of the transfer support member 50. As used herein, the term "suspension contact points" means the discrete physical contact spaces, areas, or regions between the product 25 and the transfer support member 50. The area or size of the contact points may vary depending on the size, weight, and/or width of the product, and/or the size and/or width of the transfer support member 50.

Still referring to FIG. 5C, as shown, the winding mechanism 30 is configured to configure the suspended straddled arrangement of the elongated product 25 on the transfer support member 50 such that, in serial order, a first continuous length of product is arranged so that a first vertical length $L_1$ of the elongated product extends about one side of the transfer support member 50, a second vertical length $L_2$ extends over the opposing second side of the transfer support member 50 after the first length $L_1$, a first suspension portion $121S_1$ is located intermediate the first and second lengths $L_1$, $L_2$, respectively. A third adjacent length $L_3$ laterally extends along the second side of the transfer support member 50 after the second length $L_2$, a fourth vertical adjacent length $L_4$ extends along the second side of the transfer support member 50 after the third length $L_3$, a fifth vertical adjacent length $L_5$ extends along the first side of the transfer support member 50 after the fourth length $L_4$, a second suspension portion $121S_2$ is located intermediate the fourth and fifth lengths $L_4$, $L_5$, respectively, and a sixth adjacent length $L_6$ laterally extends along the first side of the transfer support member 50 after the fifth length $L_5$.

In operation the arm 21 can move have lateral directional travel components so as to move back and forth across above the transfer support member 50. In so doing, the elongated product 25 can be discharged to hang or drape from a first side of the transfer support member 50, cross over the width of the body of the member 50 and hang or drape another vertical segment down the other opposing second side. The arm 21 continues to release the elongated food so that another vertical segment or portion hangs or drapes still on the same second side before it re-crosses over the transfer support member 50 and drapes another vertical length back on the first side of the transfer support member. The non-looped straddled product can be arranged so that the suspended vertical draped lengths are substantially the same, dissimilar, or combinations thereof. The draping motion can be continued so as to substantially fill a major portion or substantially all of the length of the transfer support member with the elongated product 25. The lateral lengths of product (i.e., $L_3$, $L_6$) can be disposed so that they are substantially horizontal as shown, or in other desired configurations. The length of the lateral segments can alter and can be controlled by the movement pattern and speed of discharge, the speed of the motion of the arm, and the movement and speed of the transfer support member 50 during the loading process or operation.

FIG. 5E illustrates that in lieu of a single continuous length of product 25, a plurality of discrete product lengths can be straddle loaded onto the transfer support member 50. In operation, the winding mechanism 30 causes the arm 21 to release a plurality of discrete lengths of elongated item 25 so that the items are arranged in a suspended laterally spaced apart straddled configuration, each discrete length having opposing first and second end portions $25p_1$, $25p_2$ and an intermediate portion $121S_1$, $121S_2$, therebetween, respectively. In position, the first and second end portions $25p_1$, $25p_2$, respectively, vertically extend to reside adjacent to each other on opposing sides of the transfer support member 50 and the respective intermediate portion $121S_1$ or $121S_2$, defines a respective one suspension contact region that contacts the transfer support member 50.

Referring to FIG. 5C, stated differently, certain embodiments of the suspended straddle configuration of elongated product 25 on the transfer support or carrier member 50 is provided so that sections of the elongated product form bights $B_1$, $B_2$ ... $B_n$ that are draped from the rod, with longitudinally consecutive or serially positioned bights, being formed and/or located on opposing sides of the carrier member. The bights are sections of the elongated product that bend or curve but do not intersect. As such, the elongated product has adjacent or serially consecutive bights, each of which can have a series of bends or curves (i.e., defined by serially consecutive vertical, longitudinal, and vertical segments) that are draped on one side of the carrier member 50 before the next bight starts across the other side of the carrier member 50. The loaded transfer member 50 can define a loaded carrier member assembly with elongated product thereon. The product can be arranged on the carrier member so that the elongate product is suspended in a straddled configuration, draped from the carrier member, so that sections of the elongated product form bights, with serially consecutive bights being formed on opposite sides of the carrier member. Each or selected bights can have a plurality of bends or curves and the adjacent bights do not intersect or crossover each other.

FIG. 5D illustrates an exemplary loading motion $21p$ of the arm 21 that can be used to provide the straddle arrangement shown in either FIG. 5C or 5E. As shown, the loading motion is an open path that has a boundary that has lateral components that permits the arm 21 to travel back and forth across the width of the transfer support member 50. As shown, the arm 21 is disposed so that the travel path boundary primarily extends above the underlying transfer support member 50. FIG. 5D also shows that the travel motion $21p$ can be substantially arcuate with the shape defined by lowermost points $21p_1$, $21p_3$, and the maxima position $21p_2$. In operation, the arm 21 can repetitively travel in the motion pattern shown $21p$ or in other suitable motion patterns. FIGS. 16A–16G illustrate exemplary straddle loading motion patterns $21p$, some of which are open and some of which are closed travel paths.

FIGS. 16A, 16C, 16D, and 16E illustrate different open arcuate patterns $21p$. FIG. 16A illustrates that the arcuate pattern $21p$ can be reversed so that it turns upward with opposing end portions $21p_1$, $21p_2$, that are above the transfer support member 50 and a minima location $21m$ disposed therebetween. FIGS. 16G and 16F illustrate closed path motion patterns $21p$ for the arm 21. The pattern $21p$ shown in FIG. 16G is above the rod and has increased vertical travel distance relative to the amount of lateral travel distance. FIG. 16F illustrates that the path $21p$ may have increased horizontal or lateral travel distance relative to the amount of vertical travel distance. FIG. 16F illustrates that in certain embodiments, no matter whether an open or closed path, and notwithstanding the configuration thereof, the travel motion pattern $21p$ can be offset, inclined about, and/or not centered on or over the transfer support member 50.

FIGS. 6C and 6D illustrate the translation of the arm 21 with respect to the transport member 50 (each moving during the loading operation) that can be used to straddle load the transport member 50 with product 25 such as shown in FIG. 6C and/or 6E. The transport member 50 is located at a first position $P_1$ and is gradually moved forward, typically in a unidirectional manner, to a second position $P_2$ as the arm 21 drapes or hangs the product 25 thereon. Thus, in the portion of the loading cycle illustrated, the transport member 50 moves a distance $\Delta P$. The travel path of the transport member can be such that it is generally below and different from that of the arm 21. In certain embodiments, the arm 21 travels side to side over the transport member with a constant or variable speed while the transport member 50 moves unidirectionally forward at a desired speed.

The length of the arm 21 can vary depending on various factors, such as, but not limited to, the size of the product, the forward speed of the product, the desired winding pattern and the like. In certain embodiments, the length of the arm 21 is sized to be at least the length of the transport member 50. In other embodiments, the length of the arm 21 is such that the elongate product 25 travels at least about 2–8 feet, and typically at least about 6 feet, before being discharged therefrom onto the support member 50.

Figure 9:
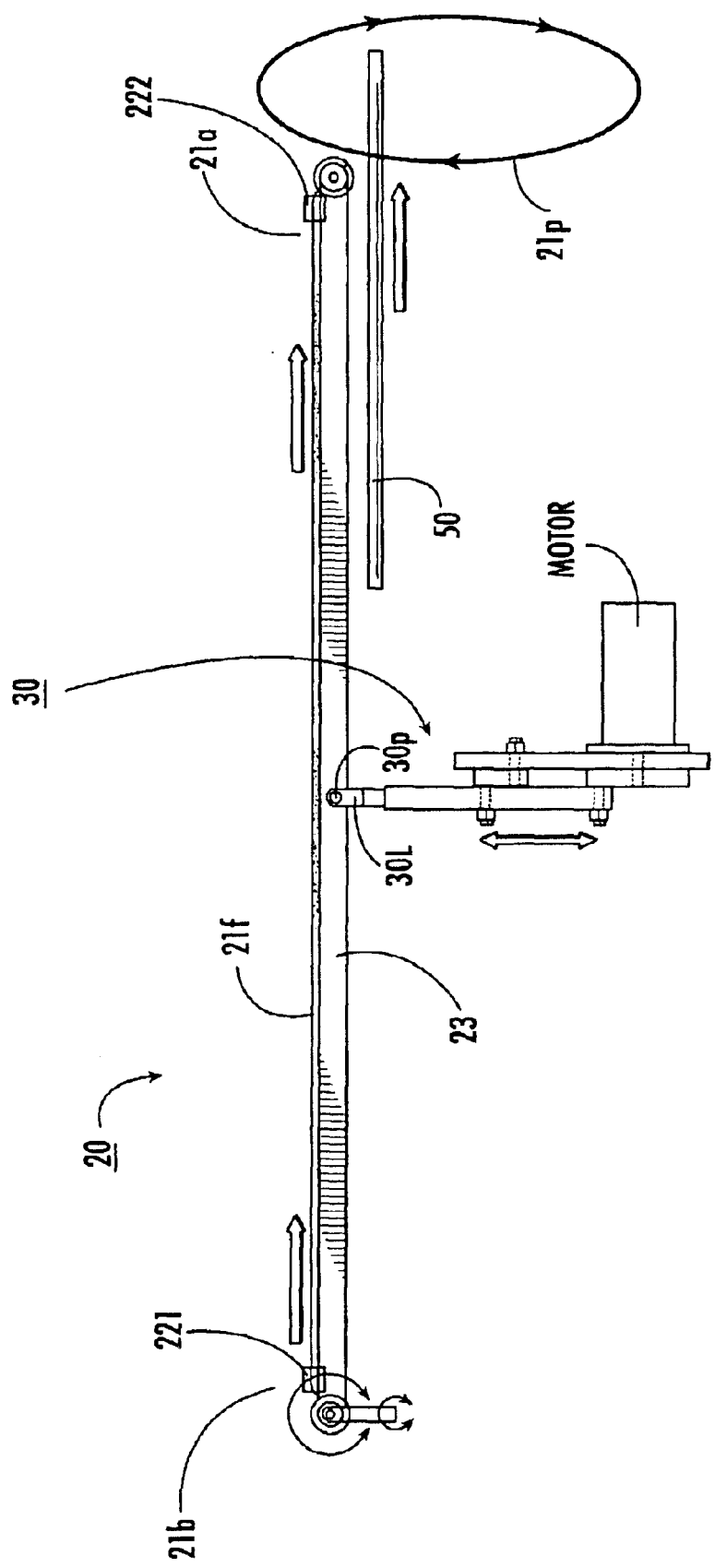
FIG. 9 is a side view of an automated winder system illustrating the winder attached below the winding arm according to embodiments of the present invention.
Figure 11:
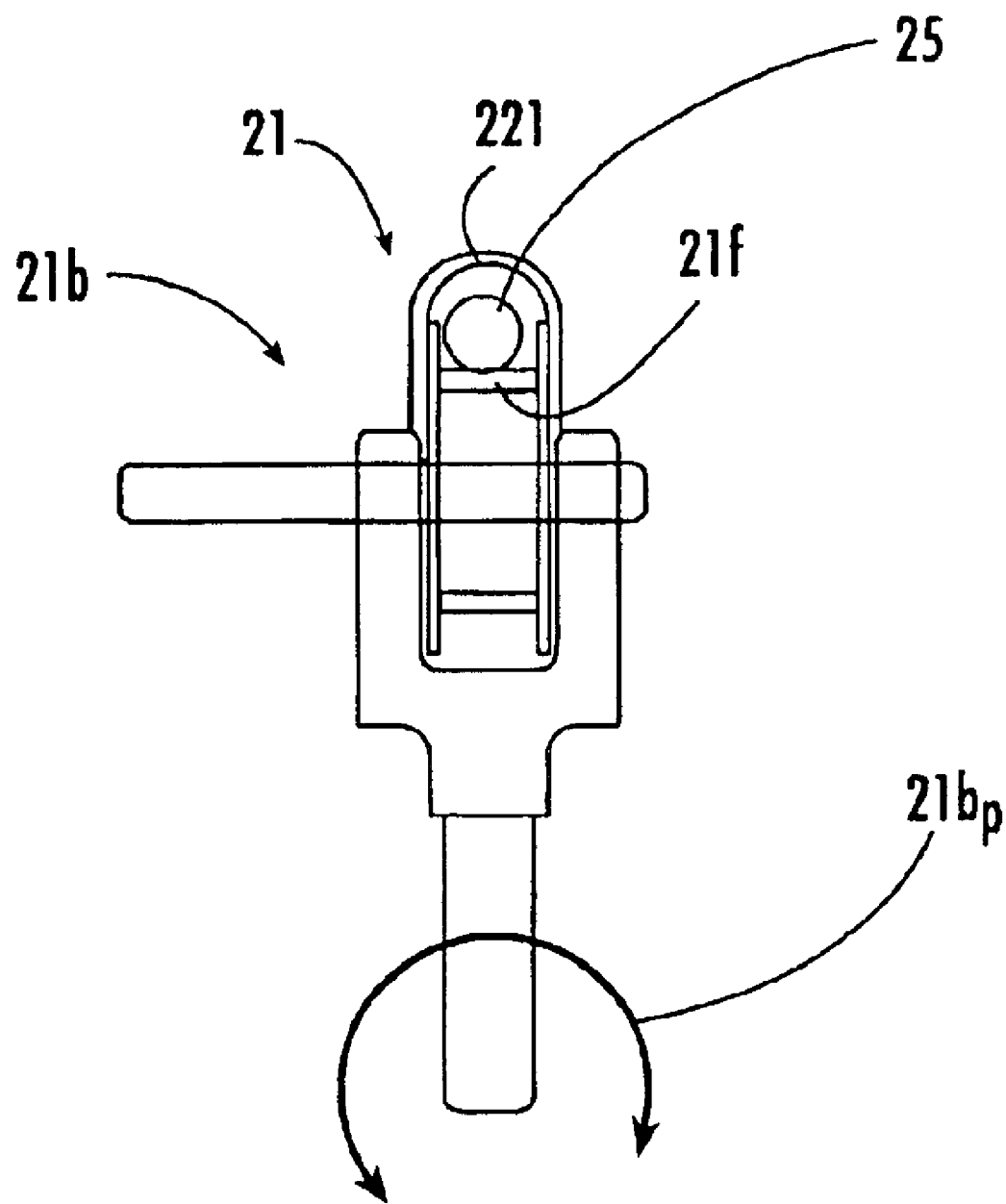
FIG. 11 is an end view of the winder arm shown in FIG. 9.

The automated winder 20 may be configured to be self-supporting or free-standing and portable or free-standing and secured to the production floor relative to the related upstream and/or downstream equipment, as desired. In other embodiments, the second end portion 21b of the arm can be attached to the extruder or upstream device 10 so as to be in communication with the discharge port 10p. As such, the second end portion 21b is stationary but can be pivotally attached to the device 10. In certain embodiments, the second end portion 21b is mounted so as to be able to move bi-directionally; the mounting or attachment can be configured in any suitable manner, such as, but not limited to, a universal joint, ball joint, bearing, elastomeric joint, and the like. FIG. 11 illustrates an end view of one embodiment of the arm 21 with an end portion 21b configured to be mounted to an extruder or other upstream-positioned device. As shown, the end portion 21b is configured to be affixed to a device 10 so that it is stationary or fixed in place but allowed to translate in a bi-directional manner in response to forces introduced by the movement of the arm 21 as it, in turn moves in response to forces introduced by the winding mechanism 30 (FIG. 9).

The arm 21 can be any desired shape or configuration. The arm 21 includes a floor 21f that supports the elongate product 25. The floor 21f can be stationary or moving, or combinations thereof. For example, the floor 21f can comprise rollers, low-friction coatings or surfaces, a conveyor belt(s), and the like. In certain embodiments, the floor 21f is defined by an endless conveyor 23 (FIG. 9) that wraps around the arm 21 to continuously convey the product 25 forward and then return to the starting position by traveling back underneath the floor 21f. As shown in FIG. 8B, the arm 21 can include a channel or chute 21ch that is configured with a shape that complements the elongated product 25. For example, for a substantially circular cross-section product 25, the floor 21f may include an arcuate or semi-circular channel 21ch formed into the floor that is configured to receive a portion of the perimeter of the body of the product therein. In certain embodiments, the channel 21ch may be sized to be slightly larger, i.e, have a sectional height and/or width that is about 0.1–10% greater, than the height and/or width of the product 25. The channel 21ch may be formed over all or portions of the length thereof. The elongate product 25 can be held in the channel 21ch as it travels over the length of the arm 21.

As shown in FIGS. 8A and 8B, the arm 21 may include a cover member 21c that covers the floor 21f and encloses the elongate product 25 therein. In certain embodiments, the channel 21ch and the cover 21c may be formed from two or more matable shell members or, alternatively from a housing or a conduit that is positioned on the arm 21 to define an enclosed channel 21ch. The cover 21c may be transparent or translucent or include viewing windows along the length thereof so that a machine or operator may view or inspect product flow at desired points (or substantially all or all of the travel path). The cover 21c may be formed of a solid material. In other embodiments, a permeable or mesh-like cover (not shown) can be used.

Various automated detectors can be placed at desired locations along the arm to verify proper operation and to render an alert when an abnormality is indicated. Examples of such detectors include optical detectors (infrared or otherwise that respond to changes in visual intensity or generated light beams), flow meters, pressure meters, temperature sensors, and the like.

As shown in FIG. 5A, the winding mechanism 30 is configured to approach the arm 21 from the lower or bottom surface. As such, the winding mechanism 30 can be attached, directly or indirectly, to one or more of the bottom side (lower primary surface) and/or one or more sides (minor surfaces) of the arm 21. FIG. 7 illustrates that the winding mechanism 30' may alternatively be mounted to approach the arm from the topside. As such, the winding mechanism 30' can be configured to suspend the arm 21 and may be attached, directly or indirectly, at the upper primary surface and/or one or more sides of the arm 21. Still other embodiments can be configured so that the winding mechanism 30, 30' is attached via one or more end portions 21a, 21b, of the arm (not shown). Combinations of the attachment configurations noted above may also be used.

Referring to FIGS. 5A, 5B, and 9, the winding mechanism 30 may be attached at an intermediate position at one or more attachment locations, the attachment locations being a distance away from each of the first and second end portions 21a, 21b. Although the winding mechanism may be attached to the arm 21 at any desired length from the respective end portions 21a, 21b, in particular embodiments, the winding mechanism 30 is attached at a primary pivot location that is located inward of the ends of the arm, typically at a location that is inward at least about 20% of the length of the arm (away from each of the ends of the arm). The term "primary pivot location" describes the location on the arm 21 at which the winding mechanism drives the repetitive motion of the arm. It can be a single point contact, a plurality of points, or a region or regions, depending on the configuration of the winding mechanism itself. The attachment position/configuration, the length of the arm, and the weight of the arm and product may influence the amount of physical movement needed by the winding mechanism 30 to generate the desired translation at the end portion 21a of the arm.

FIG. 9 illustrates one embodiment in which the winding mechanism 30 is attached at a primary pivot location 30p that is approximately centrally located between each of the opposing ends of the arm 21 That is, it is located to be within about 10% of the middle location of the arm 21. In certain embodiments, as shown, the arm 21 may also include an initial enclosed entry port 221 (FIG. 11) that is configured to direct the elongated product to travel in its desired substantially linear travel path over the arm 21. Similarly, the arm 21 may include an exit block member 222 that inhibits through passage of the elongated product 25 thereby facilitating the sideward (discharge) of the elongate product 25. In other embodiments, the pivot or winding mechanism 30 can be located closer to the discharge port, i.e., proximate to or adjacent the product inlet port 21b, this position may allow the arm 21 to be shortened (not shown).

Figure 10:
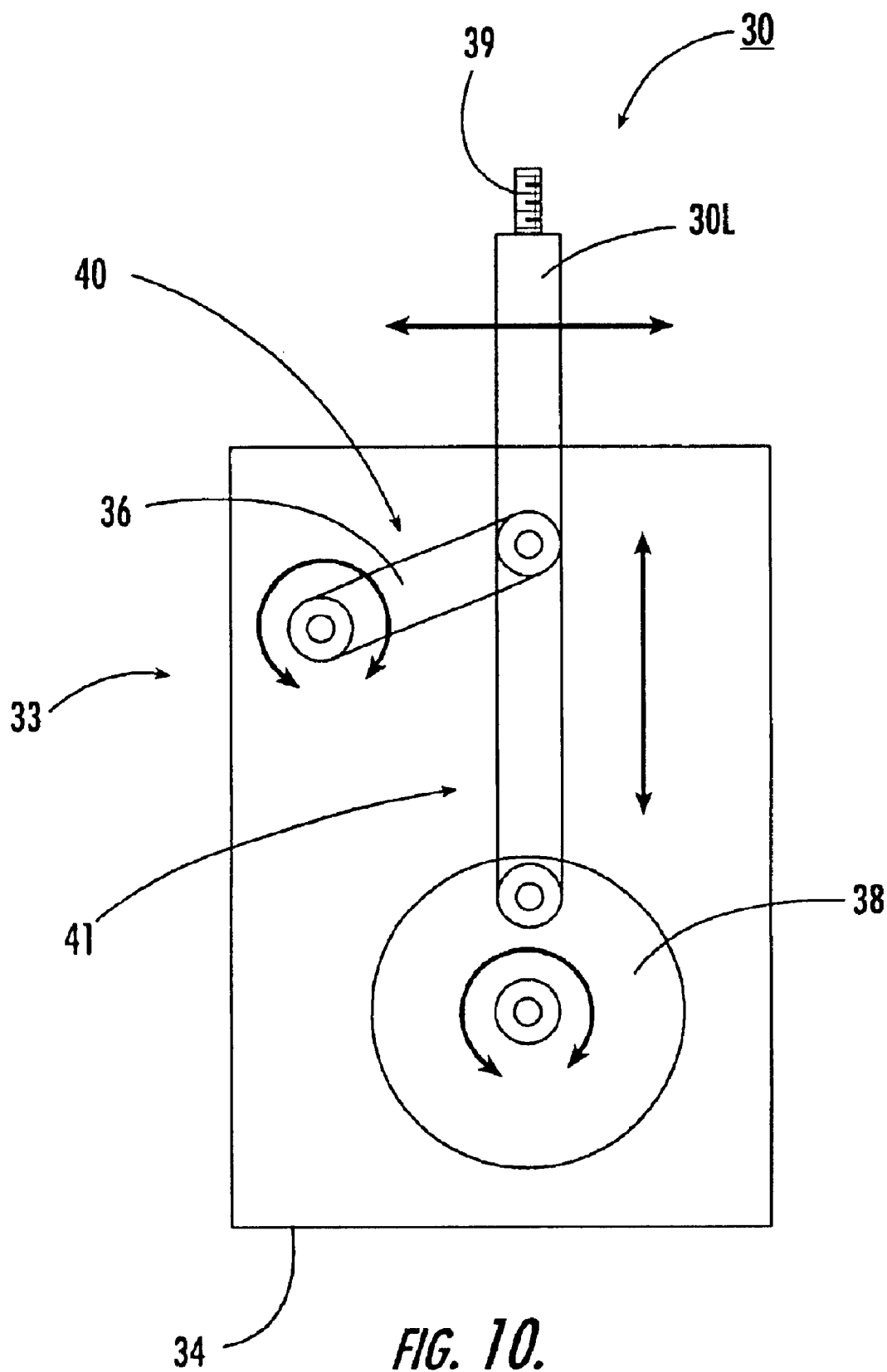
FIG. 10 is an end view of the winding mechanism shown in FIG. 9.

Referring to FIG. 10, an exemplary embodiment of a winding mechanism 30 is shown. This figure is a side view of the device shown in FIG. 9. In this embodiment, the winding mechanism 30 comprises a four-bar linkage 33 that is mounted on a stationary mount bracket 34. The four bar-linkage 33 includes a pivotably mounted rotating link 36, and a stationary mounted wheel 38, a center linkage 30L that is pivotably attached to both the pivotably mounted link 36 and the stationary mounted link 38. In operation, the link 36 and the center link 30L define a minor axis of motion control 40 while the wheel link 38 and the center link 30L define a major axis of motion control 41. The center linkage 30L can include upwardly extending threads 39 that can be used to attach the winding mechanism (directly or indirectly) to the arm 21.

The wheel 38 can be driven by a gear or shaft (not shown) to automatically turn the wheel 38 at a desired speed (constant and/or variable). Generally described, as the wheel 38 turns, the center link 30L follows the rotation of the wheel 38, making the center link 30L move both laterally (indicated by the side-to-side arrows in the upper portion of the linkage) and vertically (indicated by the vertical arrows) all the while limited by the pivotably attached link 36 that limits the lateral motion of the center linkage 30L. In this way, the winding mechanism 30 causes the arm 21 to travel through a repetitive substantially elliptical pattern 21p as shown in FIG. 9. Of course any suitable winding mechanism can be employed, including, but not limited to, cam/follower arrangements, pistons (pneumatic or hydraulic), combinations of linkages and any of the above as well as other electromechanical configurations that can generate the desired repeated winding motion.

Figure 12A:
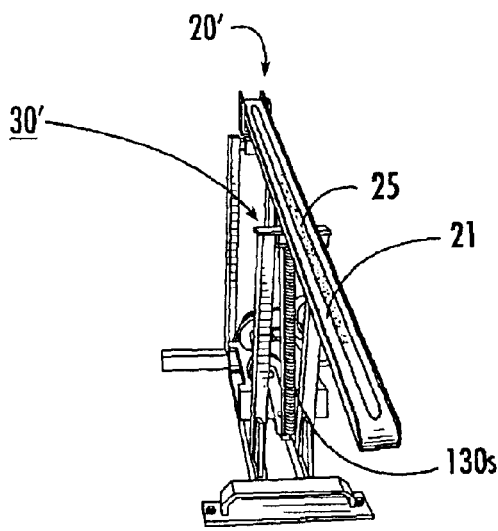
FIG. 12A is a perspective view of an alternative embodiment of an automated winder according to the present invention.
Figure 12B:
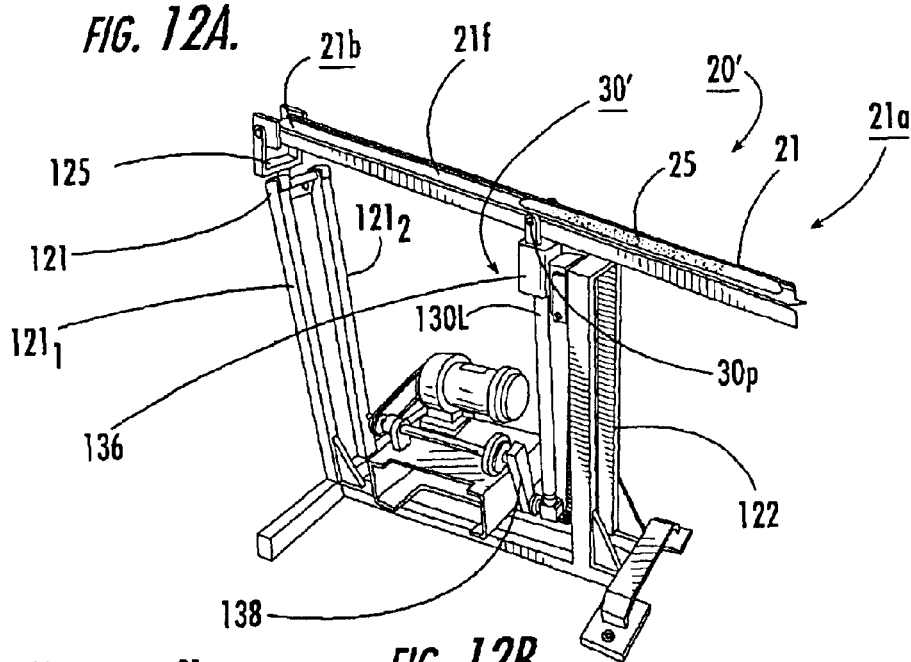
FIG. 12B is a side perspective view of the device shown in FIG. 12A.
Figure 12C:
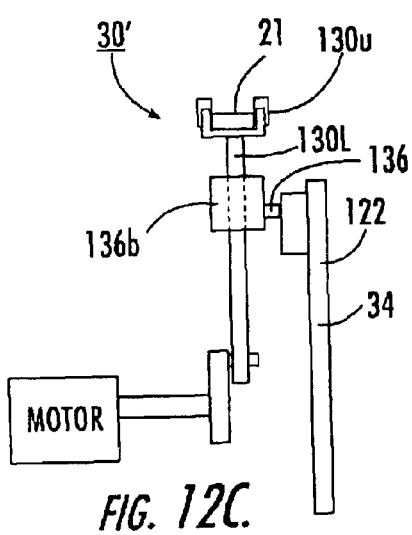
FIG. 12C is a front schematic view of the device shown in FIG. 12A.

FIGS. 12A–12C illustrate another embodiment of a winder 20'. As shown, the arm 21 has two spaced apart floor support mounting brackets 121, 122, a first one 121 positioned proximate the second end portion 21*b* of the arm and another second one 122 positioned upstream of the first one 121. The first mounting bracket 121 has a junction member 125 that is pivotably mounted to two upwardly extending arms 121₁, 121₂. The junction member 125 supports the arm 21 while cooperating with the winding mechanism 30 so that it allows the arm 21 to move in a multidirectional manner in response to movement of the arm as driven by the winding mechanism 30.

FIG. 12C shows that the winding mechanism 30' is attached to the arm 21 at a primary pivot region 30*p* that is upstream of the first floor support mounting bracket 121. The primary pivot region 30*p* is at the attachment position of the winding mechanism linkage 130L to the arm. As shown in FIG. 12C, the linkage 30L includes a fork-like upper portion 130*u* that spans the width of the arm 21 and attaches to opposing sides thereof. Similar to the embodiment shown in FIG. 10, the winding mechanism 30' shown in FIGS. 12A–12D causes the arm to move in a substantially elliptical rotational movement pattern. In this embodiment, the winding mechanism 30' includes a vertically elongate linkage 130L (such as a piston or rod) that slidably moves through linkage 136 proximate the upper portion of the vertically elongate linkage 130L and that is connected at the lower portion thereof to a rotational member 138. As shown by the arrows located adjacent the lower rotational member 138 in FIG. 12D, in operation, the clockwise rotation of member 138 forces the vertically elongate linkage 130L to move forward and downward and then rearward and upward relative to the arm 21. A counterclockwise arrangement may also be used. The movement of the vertically elongate linkage 130L is further limited or shaped by the movement of the upper linkage 136 that pivots side to side with respect to the arm 21 (indicated by the arcuate arrows proximate the upper link 136) as the linkage 130L slides through the block 136*b* that cooperates with the upper link 136. The upper link 136 is pivotably mounted to a block 136*b* and is mounted to the platform 122 via stationary mounting bracket 34. A spring 130*s* can be mounted to the platform 122 to help control and/or dampen the movement of the winding mechanism 30' and/or linkage 130L. As the linkage 130L is rotated by the lower linkage 138 it slides upwardly and downwardly through the linkage 136*b* that in response pivots in lateral direction relative to the arm 21 to cause the repetitive rotation cycle.

Figure 12D:
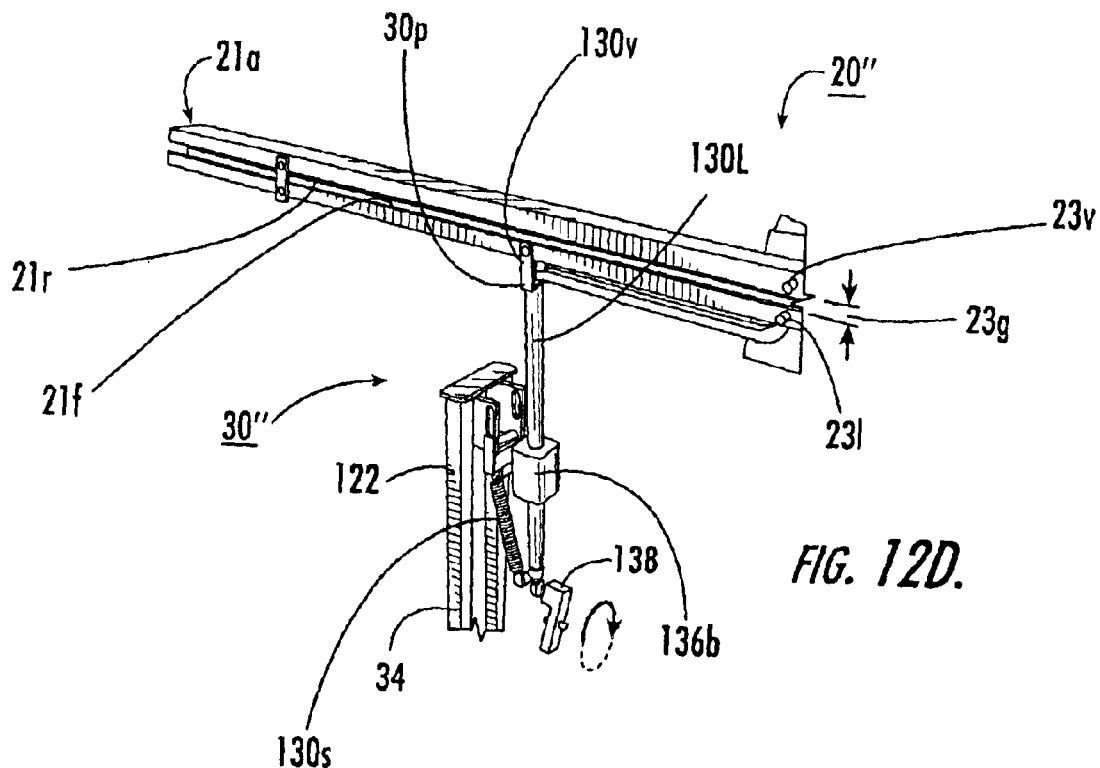
FIG. 12D is a side view of an alternate embodiment of an automated winder according to embodiments of the present invention.
Figure 12E:
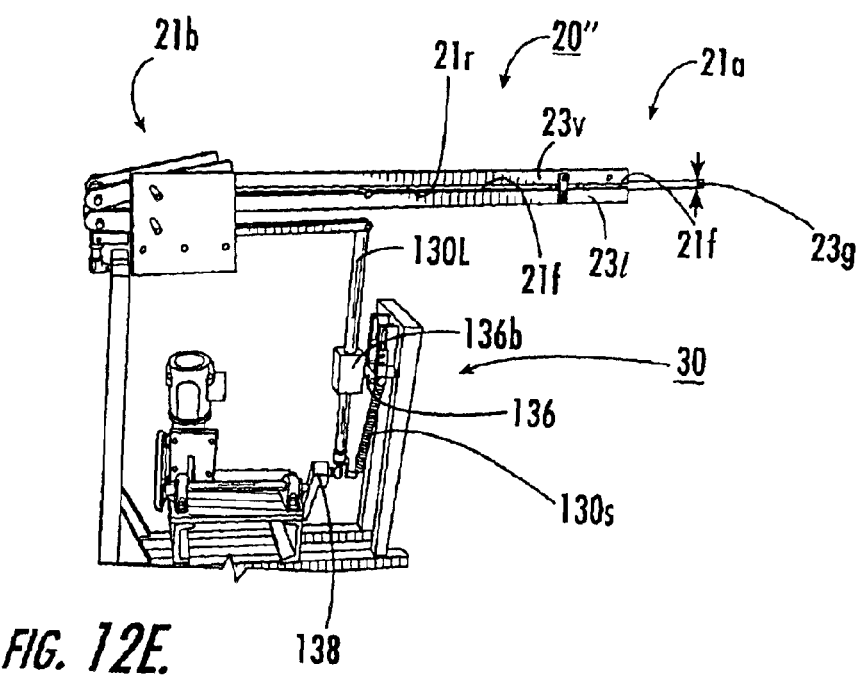
FIG. 12E is a side perspective view of the device shown in FIG. 12D.
Figure 12F:
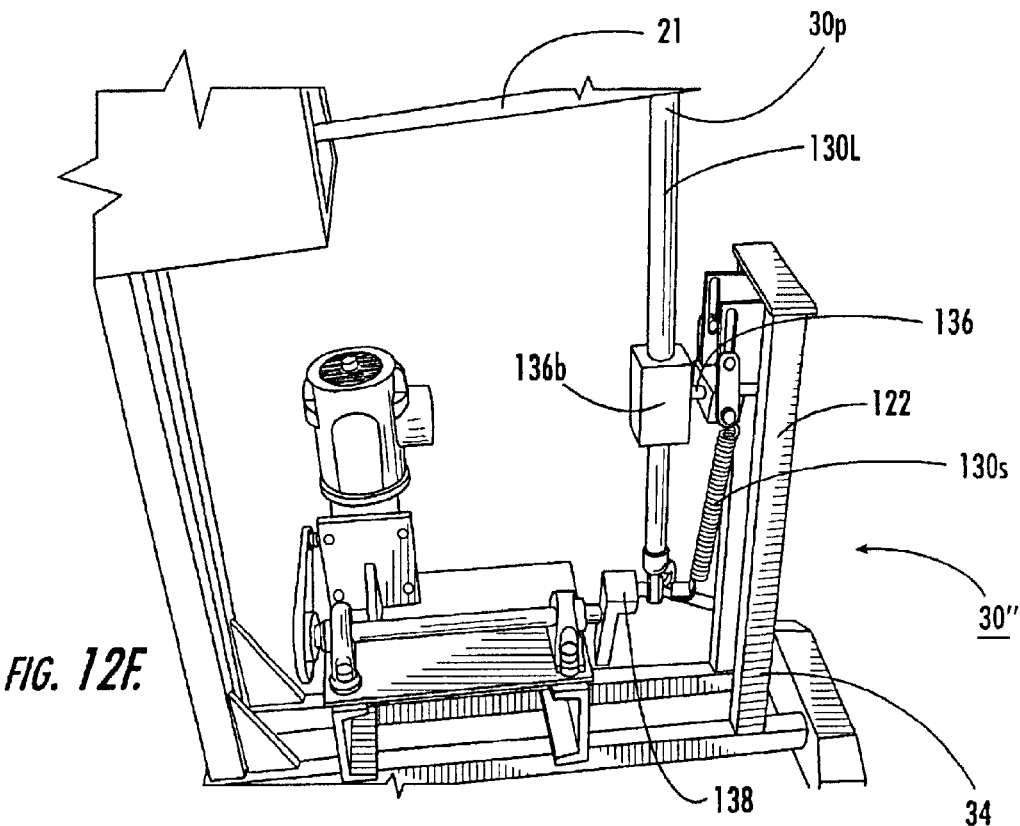
FIG. 12F is an enlarged side view of the winder shown in FIG. 12E with the arm partially cutaway.
Figure 12G:
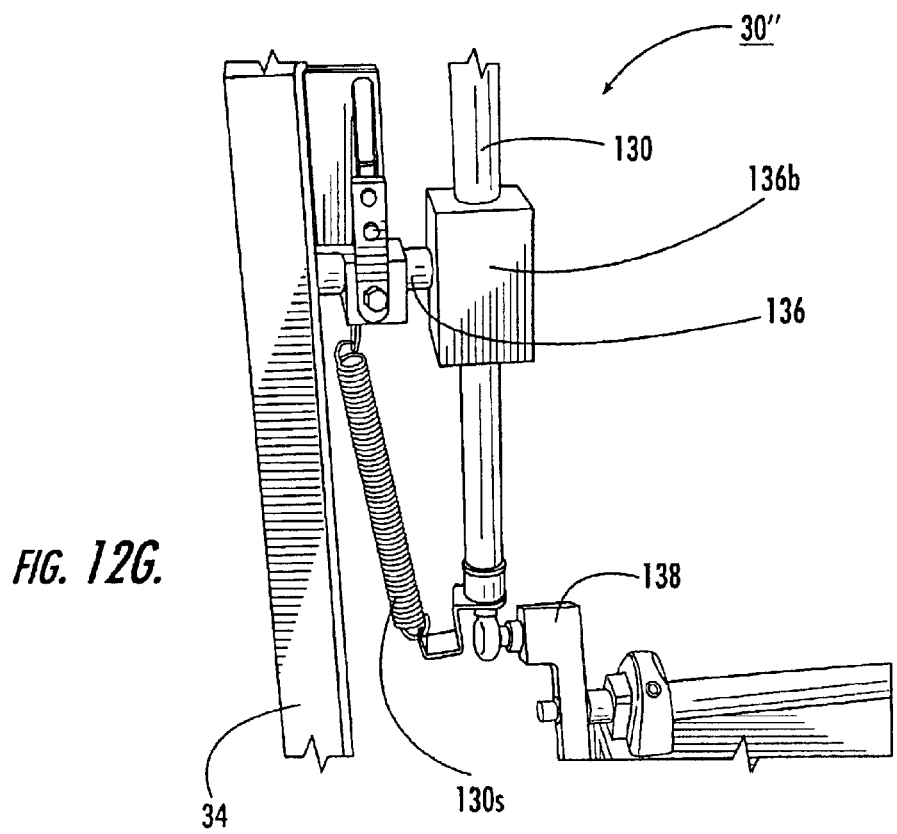
FIG. 12G is side view of a winding mechanism shown in FIG. 12F.

FIGS. 12D–12G illustrate an additional embodiment of the winding mechanism 20". This embodiment illustrates both a different floor or arm configuration (two overlying conveyors with an intermediate food travel path), and a variation on the winding mechanism linkage assembly. Referring to FIG. 12G, an outer perimeter portion of the rotatable link 138 is shown attached to the lower portion of the link 130L. As the link 138 rotates, the elongated link 130L is directed to travel in a multidirectional motion (up and down and sideways). In operation, the rotatable link 138 is substantially constantly rotated or driven by an electric motor. One suitable motor is a ¼ HP 480V three-phase motor having about a 1750 rpm output with a 2.2 ratio.

In addition, as shown in FIGS. 12F and 12G, the upper link 136 can be (pivotably) attached to the block 136*b* the link 136 can be (pivotably) attached to the platform 122 via a stationary mounting bracket 34. The spring 130*s* can be attached to the lower portion of the linkage 130L (proximate the connection to the rotatable link 138) on one end portion and the platform 122 (or bracket 34) at a location proximate the upper link 136 at the other end portion to help control/ dampen and/or stabilize the motion generated by the winding mechanism 30".

FIGS. 12D and 12E illustrate an arm configuration that can employ two overlying aligned and vertically spaced apart surfaces that define a roof or ceiling 21*r* and a corresponding floor 21*f*. In certain embodiments, the roof 21*r* and/or floor 21*f* may be formed from one or more conveyors (shown as two spaced apart endless conveyors) 23*u*, 23*l*. The lower conveyor 23*l* defines the floor 21*f* for food or other item over the arm travel path. The two surfaces 21*r*, 21*f* that may be defined by conveyors 23*u* (roof), 23*l* (floor) can be spaced sufficiently apart so as to define a gap therebetween 23*g*. The gap 23*g* can be sized so as to allow both conveyor primary surfaces (those facing each other) to contact the food in opposing locations in a manner that does not deform the shape of the food as it travels between the two surfaces 21*f*, 21*r* and/or conveyors 23*u*, 23*l*, but sufficiently close so as to help guide the food in the travel direction. In other embodiments, the gap 23*g* may be such that the roof, ceiling, or upper conveyor resides a distance above the food. The two conveyors 23*u*, 23*l* may be configured to move at the same speed. In certain embodiments, the speed of the conveyors may be operated between about 2–10 ft/sec, and in particular embodiments, at about 6.5 ft/sec linear movement. The conveyors 23*u*, 23*l* may be set to vary speed during operation and may be in communication with a variable speed or frequency controller from AC Tech. The drive motor may be configured similar to that described above for the winder mechanism 30. Although described as two endless conveyors, other configurations can also be used. For example, the floor 21*f* and/or roof 21*r* can be formed from more than one conveyor. In other embodiments, the roof can be comprised from 2 or more conveyors creating a channel configuration having a triangle or other multi-sided configuration. The floor can also comprise a plurality of conveyors also defining a multi-sided shape (such as a triangle, open square, hexagon, and the like). In addition, portions of the floor and/or ceiling may be configured as stationary components. Combinations of the above may also be used.

In other embodiments, the floor 21*f* of the arm 21 can be configured as a "V" or "U" shape (using a conveyor surface formed in that configuration or a plurality of conveyors spaced and oriented to define the desired shape) (not shown) to help hold the food therein as it travels along the arm. Combinations of the above may also be used.

Figure 13A:
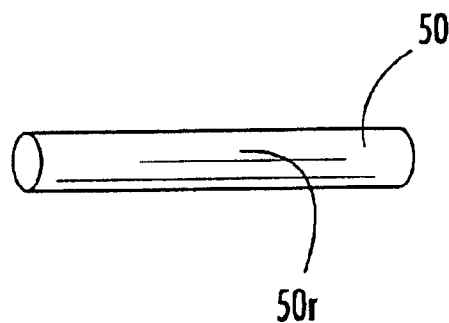
FIG. 13A is a front view of an example of a stick/rod as employed as a transfer support member suitable for loading with the automated winders of the present invention.
Figure 13B:
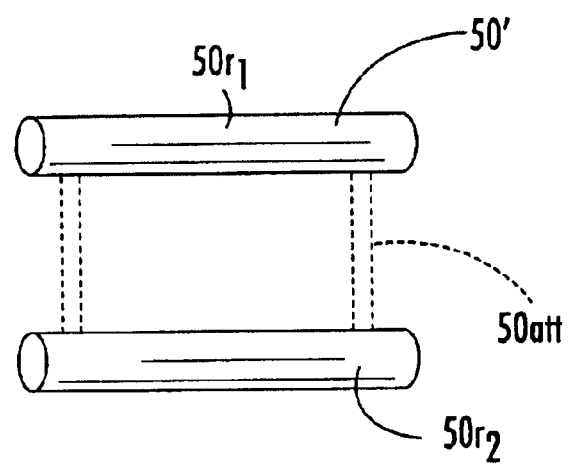
FIG. 13B is a front view of an alternative embodiment of a transfer support member according to the present invention.
Figure 13C:
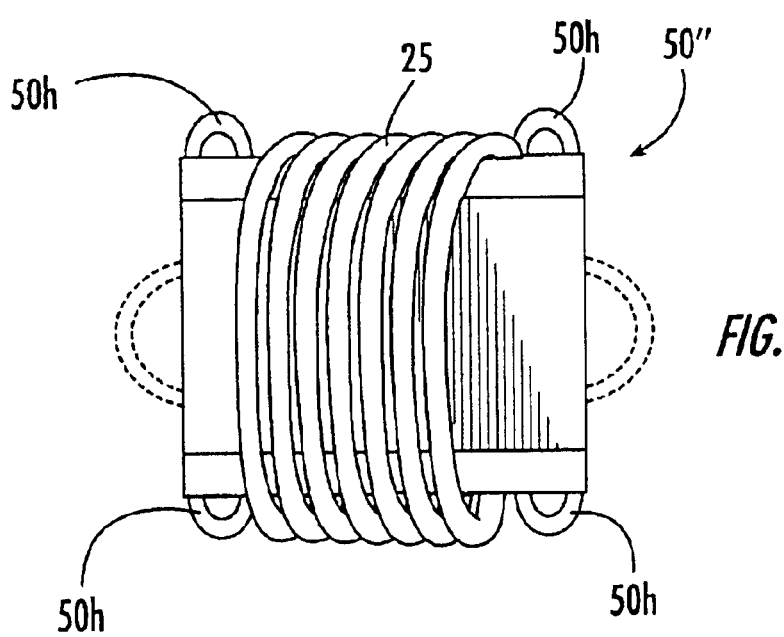
FIG. 13C is a front view of yet another alternative embodiment of a transfer support member according to the present invention.

FIGS. 13A–13C illustrate examples of particular embodiments of transfer support members 50. As shown in FIG. 13A, the food transport member 50 may be configured as rod or "stick" 50*r*. FIG. 13B illustrates that the food transport member 50' may be configured as a pair of separate rods or sticks 50*r*1, 50*r*2, that are vertically spaced apart and aligned. The two rods 50*r*1, 50*r*2 may be optionally attached as shown by the broken line 50*att* feature in FIG. 13B. In this embodiment, the winder arm 21 can be configured to travel through a winding path that has a sufficient vertical distance so as to encompass or encircle both of the rods 50*r*1, 50*r*2. FIG. 13C illustrates that the transport member 50''' can include a contiguous body or a shape or configuration that extends below the upper portion as there is no longer any requirement that the transport member be inserted into hooks to remove the suspended product therefrom. The contiguous body may be solid, perforated, forminated, or configured to reduce weight. Similarly, the transport member 50 may include one or more handles 50*h* or other externally accessible handling means disposed along the length and/or at selected end portions thereof to promote ease of handling to transport the loaded member to another active station. It will be appreciated by those of skill in the art that the present invention now allows a number of different configurations that that can act as suitable support members 50, 50', 50" and the present invention is not limited to the embodiments described herein. In addition, in operation, a plurality of transfer support members, of the same or different configurations, may be sequentially (manually or automated) serially loaded and removed by aligning them with the winder 20.

Figure 14A:
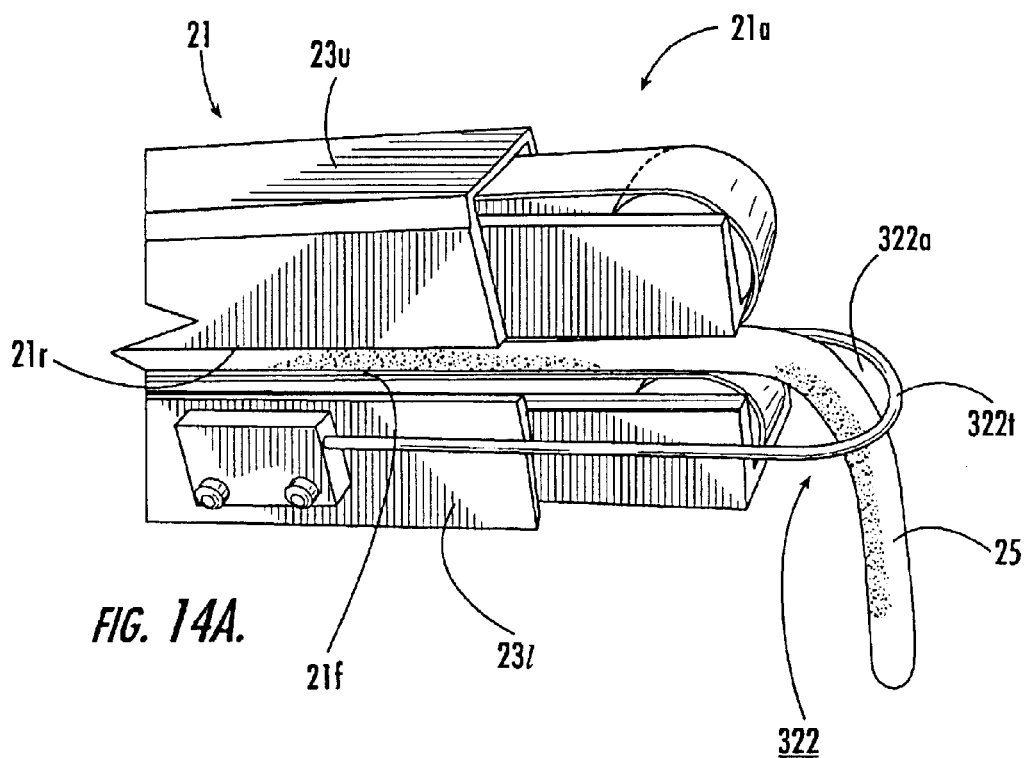
FIG. 14A is a side view of a discharge portion of the arm illustrating an end guide according to certain embodiments of the present invention.
Figure 14B:
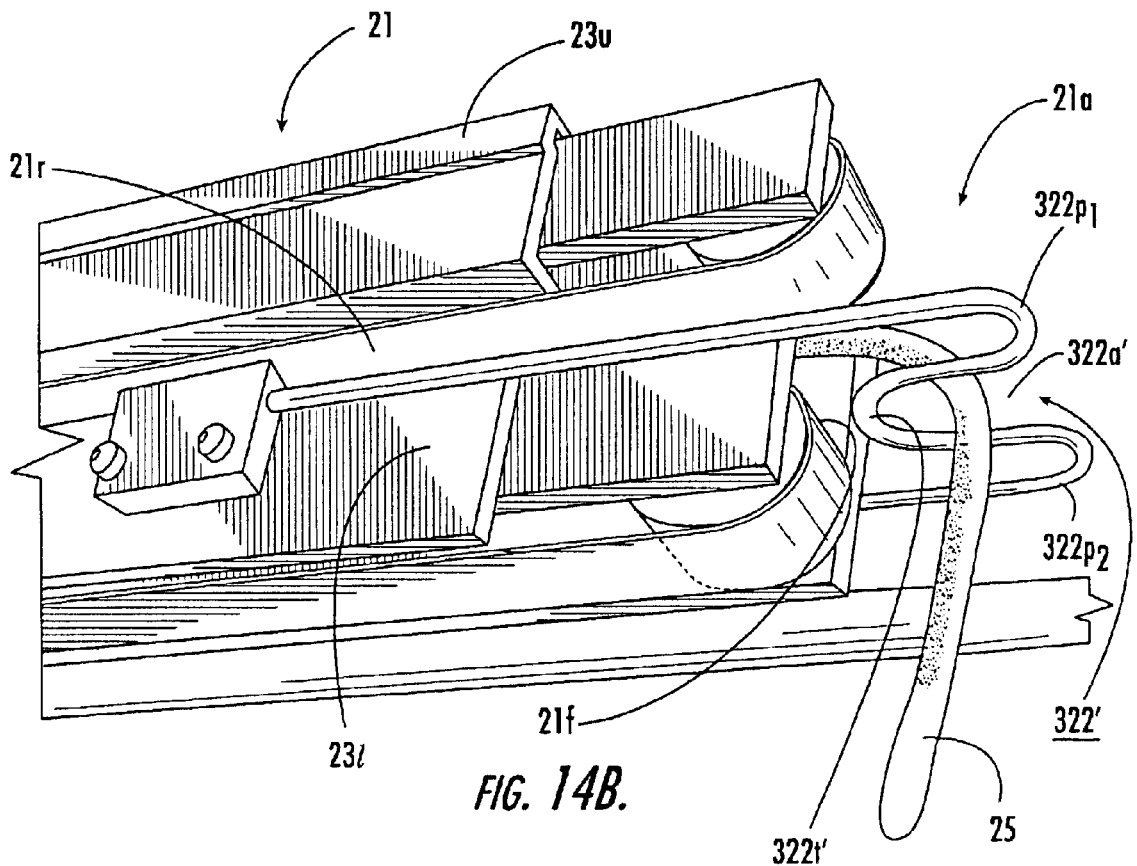
FIG. 14B is a side perspective view of an alternate configuration of an end guide according to certain embodiments of the present invention.

FIG. 14A illustrates that the distal end portion 21a of the arm 21 can be configured with an end guide 322 that helps to direct the movement of the food as it exits off the arm 21 during the winding operation as the arm moves in its desired winding motion pattern. In operation, the elongated item 25 (shown in broken line) travels through an aperture 322a defined by the end guide 322. The guide 322 may have an outer perimeter that is looped and defines a tongue 322t with an open center. FIG. 14B illustrates an alternate embodiment of an end guide 322'. The guide 322' includes an inwardly oriented tongue 322t' that defines the aperture 322a' and spaced apart prongs 322p₁, 322p₂. In this embodiment, in operation, the food 25 travels outwardly over the perimeter innermost portion of the tongue 322t. Other configurations of guides 322, 322' may also be used. The end guide 322, 322' is illustrated with the arm configuration that employs a ceiling or roof and floor 21f, 21r; however, the end guide 322, 322' is not limited thereto and may be used with any desired arm configuration. In certain embodiments, the end guide 322, 322' may be positioned proximate to and substantially vertically aligned with the floor 21f. In other embodiments, the end guide 322, 322' may be configured to extend outwardly at a vertical level that is below the floor 21f. In yet other embodiments, the end guide 322, 322' may be configured to rise above the floor 21f.

Figure 15A:
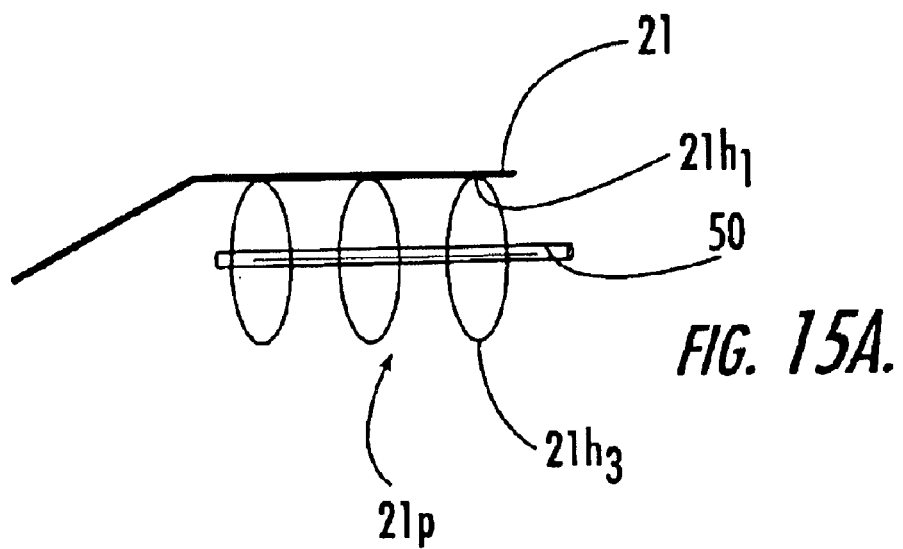
FIG. 15A is a schematic of a winding pattern according to embodiments of the present invention.
Figure 15B:
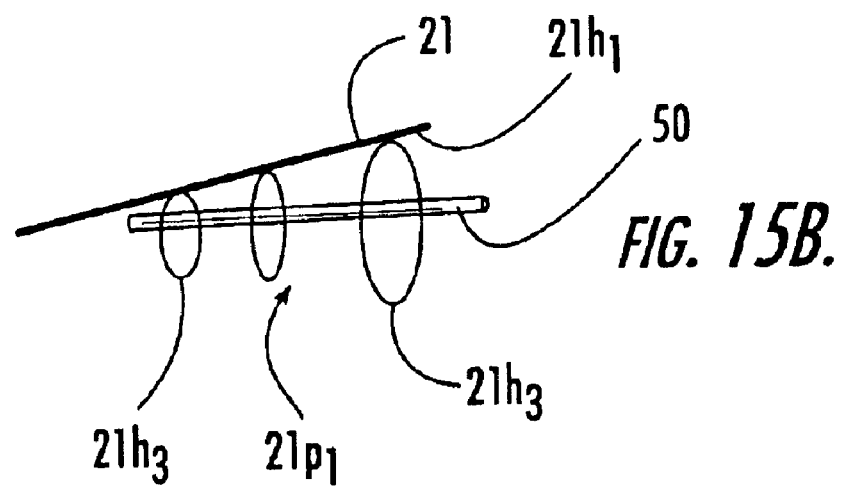
FIG. 15B is a schematic of another winding pattern according to embodiments of the present invention.

FIGS. 15A and 15B illustrate exemplary winding motion patterns 21p, 21p' contemplated by certain embodiments of the instant invention. FIG. 15A illustrates a pattern 21p that is substantially constant over the winding of the length of the loading member 50 and that the arm 21 can be held substantially planar (horizontal) as it moves through the winding motion. FIG. 15B illustrates that a variable winding motion pattern 21p' can be generated. As shown, the winding pattern 21p' increases or amplifies from left to right to have greater minima and maxima height 21h₁, 21h₃ at various positions along the loading member (or between different loading members or products and/or can increase from left to right). FIG. 15B also illustrates that the arm 21 may be inclined during the winding operation (the arm can also be declined or operated at various times to be a combination of inclined, declined, or level. In addition, the winding pattern 21p, 21p' can vary in other manners (shape or pattern) along the length of winding a particular loading member 50 or vary for each or selected loading members or products.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A packing mechanism for arranging suspended elongated product on a carrier member, comprising:

an elongated packing arm having an associated length and opposing first and second end portions, said first end portion comprising a contact member that has spaced apart first and second fingers, wherein, in operation, the contact member is adapted to periodically contact a portion of a suspended elongated item held on a carrier member to cause adjacent portions of the suspended elongated item to move closer together on the carrier member; and a drive mechanism attached to the second end portion of the packing arm and configured to repeatedly move the packing arm in a predetermined motion so that the contact member serially moves in a cycle that includes moving in a first longitudinal direction, descending a desired vertical distance sufficient to cause the contact member to engage the carrier member, moving in a second longitudinal direction opposite the first longitudinal direction with the contact member substantially horizontal an parallel to the orientation of the carrier member, then rising a distance to reside above the carrier member.

2. A packing mechanism according to claim 1, wherein the drive mechanism comprises a mechanical linkage with a rotating wheel, and wherein, in operation, rotation of the wheel causes the linkage to direct the packing arm travel in the predetermined motion, and wherein the contact member fingers are configured to push suspended segments of the elongated item closer together on the carrier member with a generally horizontal longitudinal stroke.

3. A packing mechanism according to claim 2, wherein the drive mechanism is configured to cause the arm to stall for an interval of time between a rearward and forward travel.

4. A packing mechanism according to claim 2, wherein, in operation, the drive mechanism comprises a motor that drives the rotating wheel.

5. A packing mechanism according to claim 1, in combination with the carrier member and lengths of one or more elongated items so that the one or more elongated items are suspended in a straddled looped or non-looped configuration.

6. A packing mechanism according to claim 5, wherein, in operation, the carrier member travels in a unidirectional travel path located below the packing arm as the packing mechanism repeatedly travels through its movement cycle.

7. A packing mechanism according to claim 5, wherein the elongated item is an extruded or stuffed product held in a casing.

8. A packing mechanism according to claim 7, wherein the elongated item is a meat product.

9. A packing mechanism according to claim 5, wherein the elongated item is a continuous length of portioned or linked meat.

10. A packing mechanism according to claim 8, wherein the elongated meat product is a continuous length of non-linked meat.

11. A packing mechanism according to claim 5, wherein the carrier member is a rod having a length of at least about six feet.

12. A packing mechanism according to claim 1, wherein the packing mechanism defines a portion of a food processing facility.

13. A packing mechanism according to claim 5, wherein, in operation, the packing arm travels a first selected path, the path being two or three dimensional in direction to cause the fingers to straddle the carrier member, and the carrier member is cooperably aligned with and below the packing arm, and wherein the carrier member travels in a second open unidirectional path.

14. A packing mechanism according to claim 5, further comprising a stationary platform that supports a portion of the drive mechanism, the platform including first and second laterally extending mounting brackets, the first mounting bracket residing at a height that is above the second mounting bracket, wherein the first mounting bracket is configured to receive the packing arm therethrough so that the packing arm is able to rest against and pivot as the packing arm moves through its cycle, and wherein the second mounting bracket is configured to receive the carrier member and hold it in a substantially horizontal orientation.

15. A packing mechanism according to claim 14, wherein the platform includes a drive track that extends in a longitudinal direction, and wherein the second mounting bracket is attached to said drive track so that, in operation, the carrier member moves in a direction that is defined by the drive track to allow the packing arm to contact longitudinally spaced apart regions of the carrier member as the packing arm travel, through a plurality of cycles.

16. A packing mechanism according to claim 1, wherein the contact member fingers extend downward in a generally vertical orientation and are spaced apart a distance sufficient to define a gap apace that is sized and configured to straddle the carrier member and receive at least an upper portion of the carrier member therein.

17. A packing apparatus for arranging suspended elongated product on a carrier member, comprising:

an elongated packing arm having an associated length and opposing first and second ended portions, said first end portion comprising a contact member;

an elongate carrier member comprising at least one suspended elongate product held thereon disposed under and cooperably aligned with the packing arm, the carrier member configured to move generally horizontally, wherein, in operation, the contact member is adapted to push and/or pull the elongate product in a predetermined direction to cause adjacent suspended portions of the at least one elongated item to move closer together on the carrier member; and a drive mechanism attached to the second end portion of the packing arm and configured to repeatedly move the packing arm in a predetermined motion so that the contact member serially moves in a cycle that includes moving in a first longitudinal direction, descending a desired vertical distance sufficient to engage the carrier member, moving in a second longitudinal direction opposite the first longitudinal direction with the contact member substantially horizontal and parallel to the orientation of the carrier member, then rising a distance to reside above the carrier member.

18. A packing apparatus according to claim 17, wherein the contact member comprises horizontally spaced apart downwardly extending first and second fingers, and wherein, in operation, the fingers periodically straddle the carrier member and contact a portion of the suspended product while moving in a predetermined direction to thereby push and/or pull suspended portions of the elongate product closer together on the carrier member.

19. A packing apparatus according to claim 17, wherein the drive mechanism is configured to cause the arm in stall for an interval of time between the rearward and forward travel.

20. A packing apparatus according to claim 17, wherein the elongate product is a food product, wherein the carrier member is a rod that has a length that is at least about six feet, and wherein the packing arm pushes suspended portions of the elongated item closer together using generally horizontal longitudinal stroke.

* * * * *